Figure 2B:
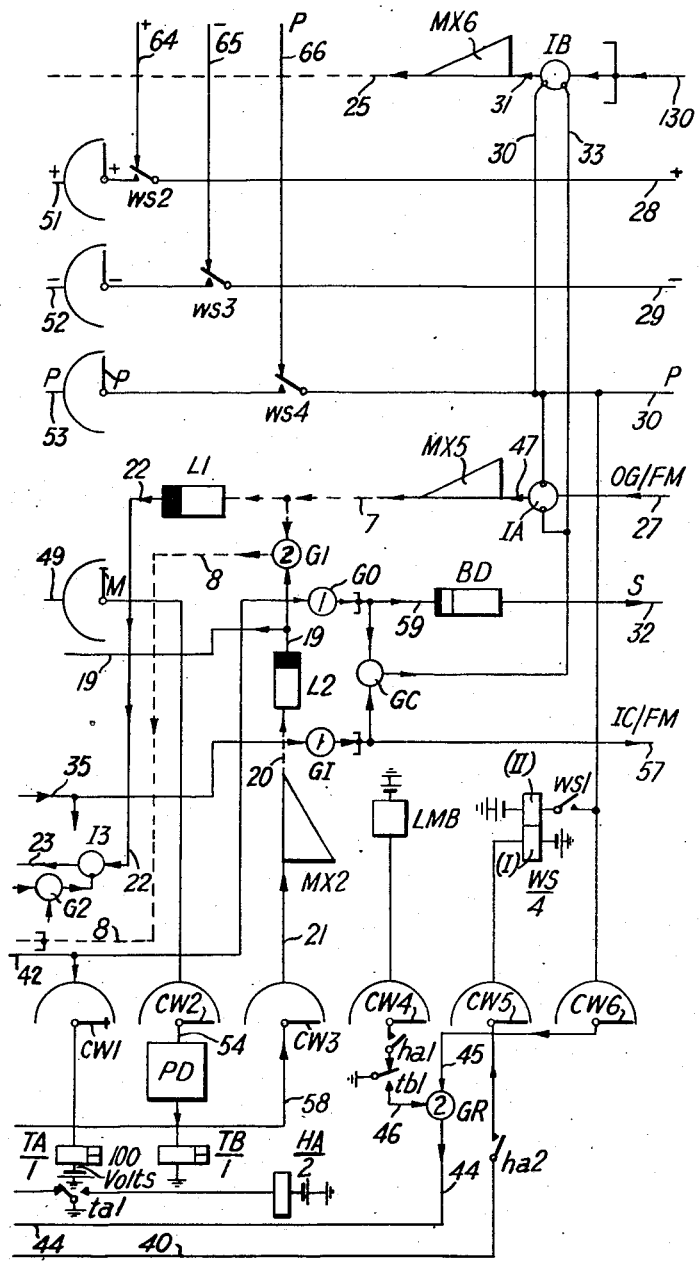

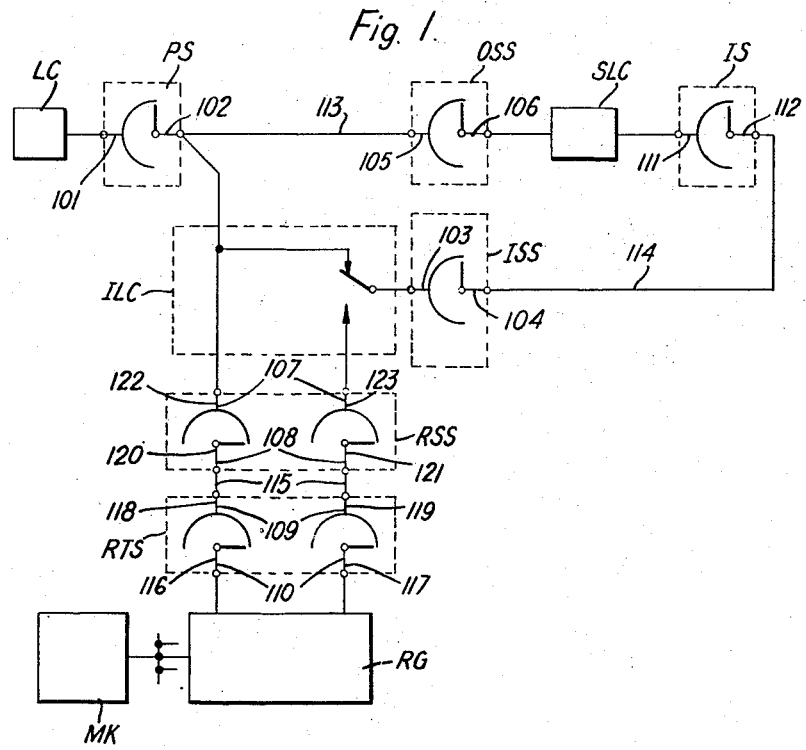

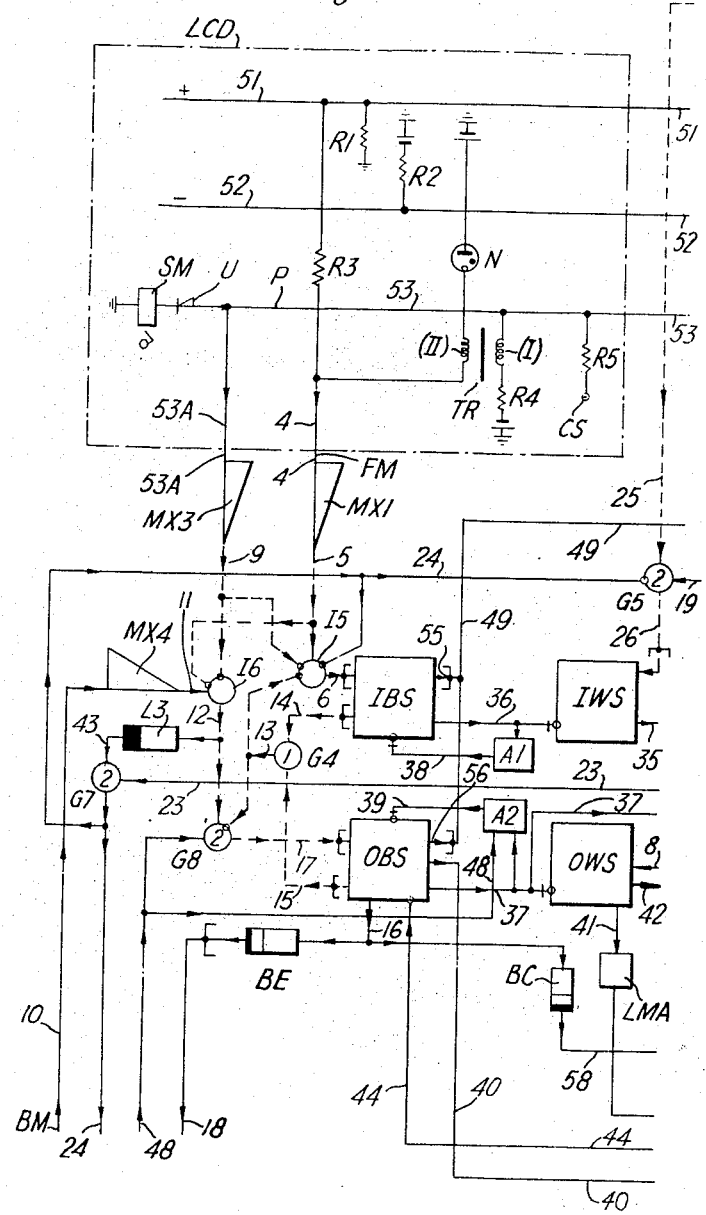

Aug. 6, 1957 J. E. FLOOD 2,802,058
AUTOMATIC EXCHANGE SYSTEMS
Filed Nov. 29, 1955 15 Sheets-Sheet 3

INVENTOR
JOHN EDWARD FLOOD

Aug. 6, 1957    J. E. FLOOD    2,802,058
AUTOMATIC EXCHANGE SYSTEMS
Filed Nov. 29, 1955    15 Sheets-Sheet 4
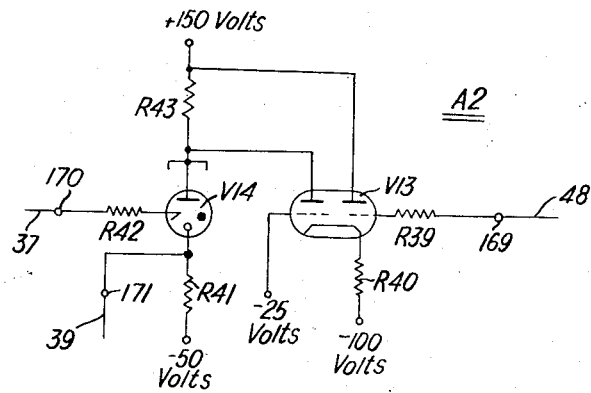
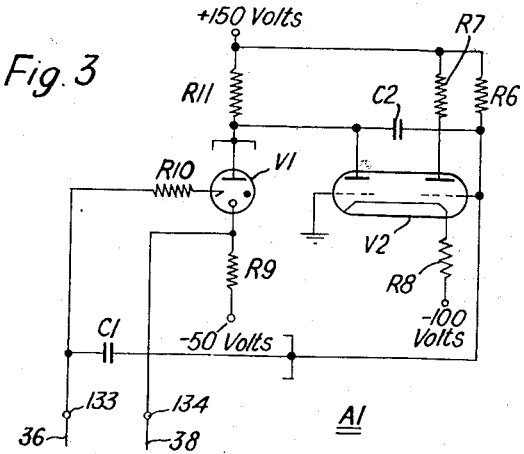
*INVENTOR*
*JOHN EDWARD FLOOD*

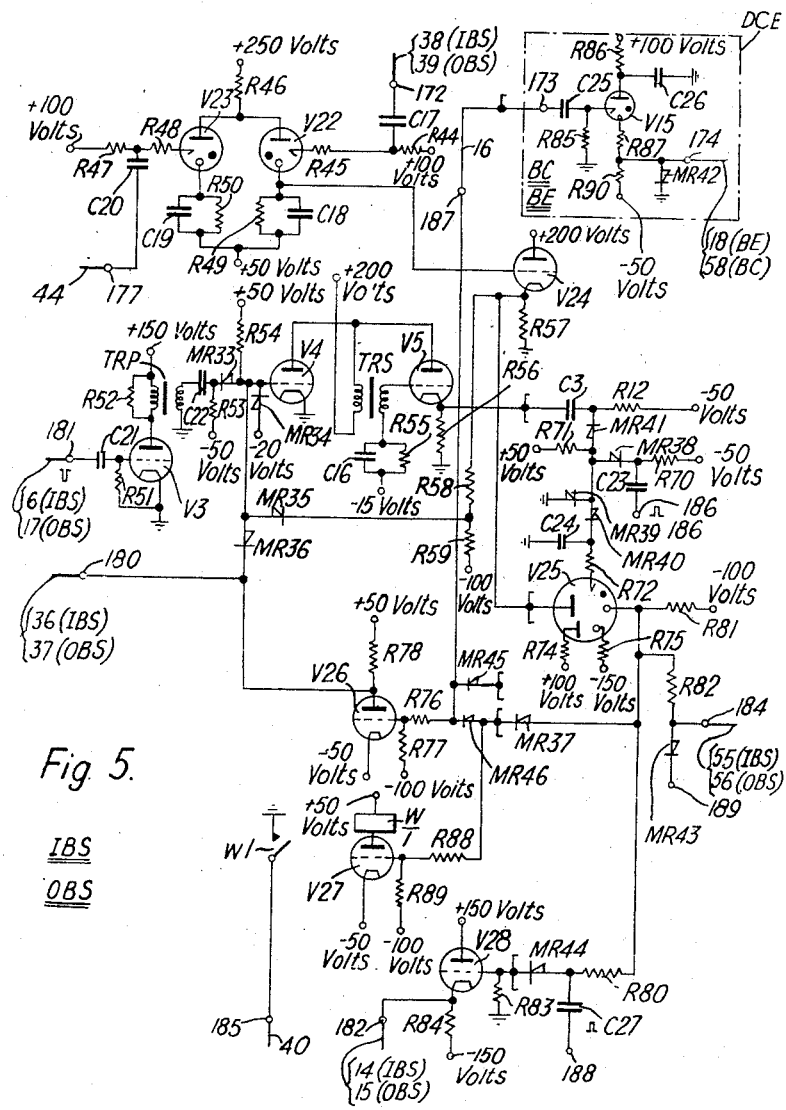

INVENTOR
JOHN EDWARD FLOOD

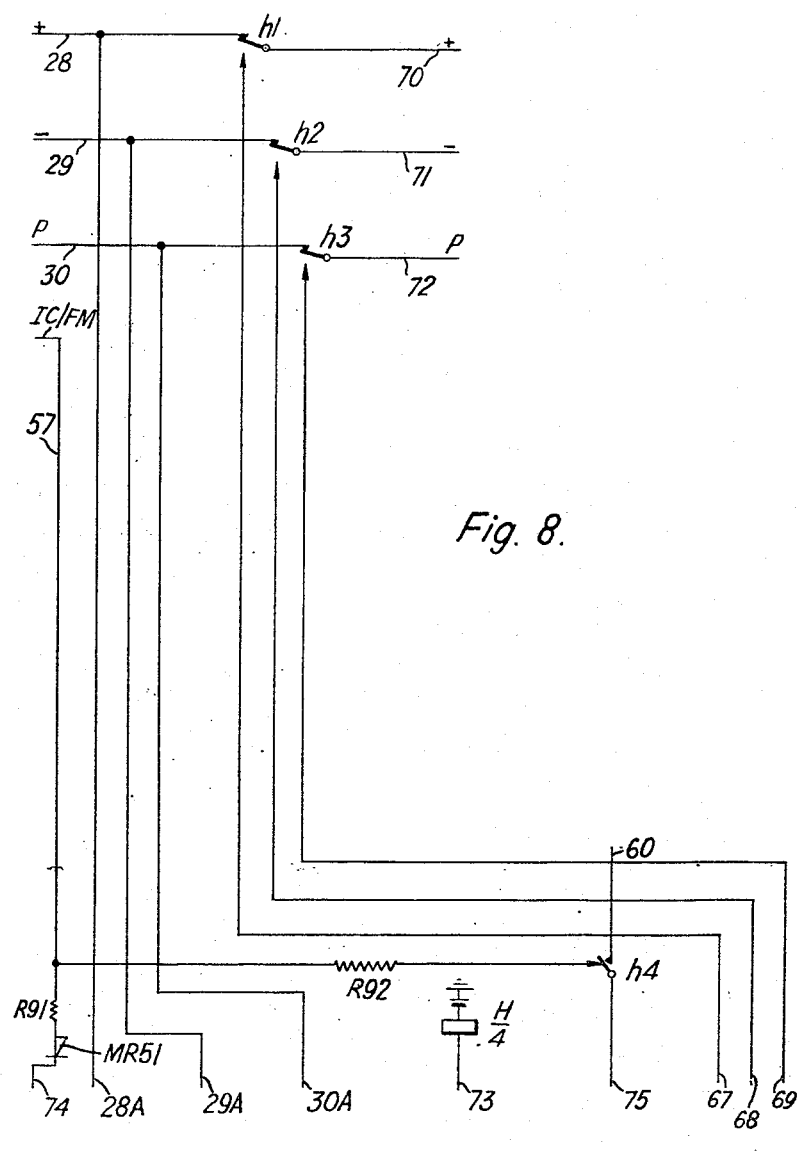

INVENTOR
JOHN EDWARD FLOOD

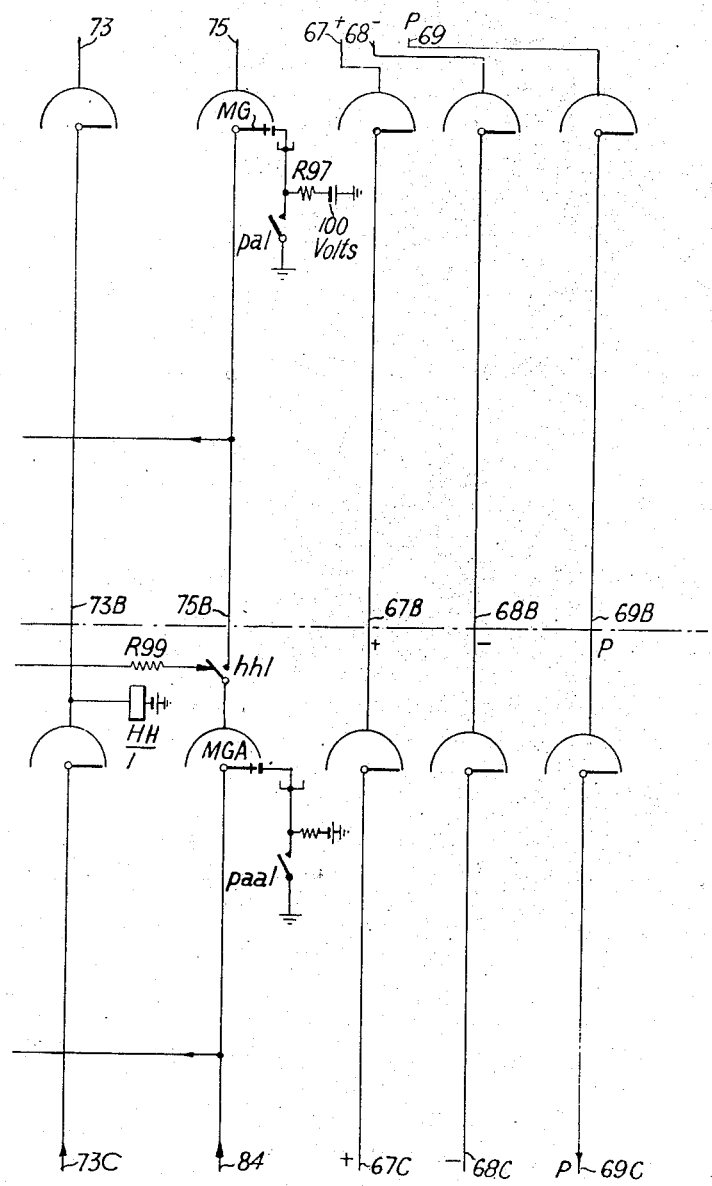

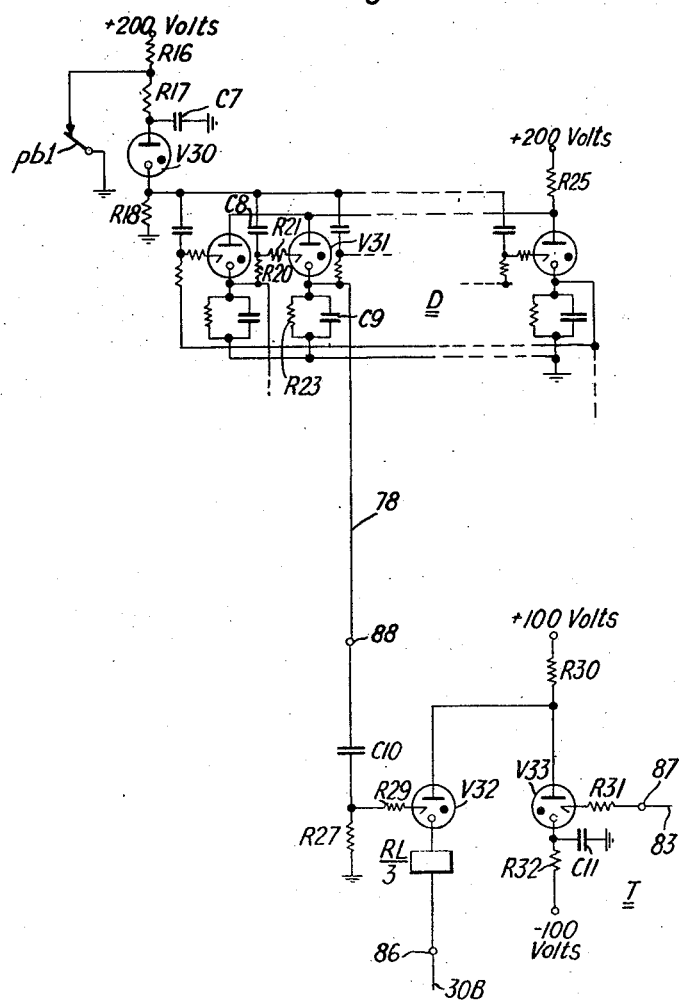

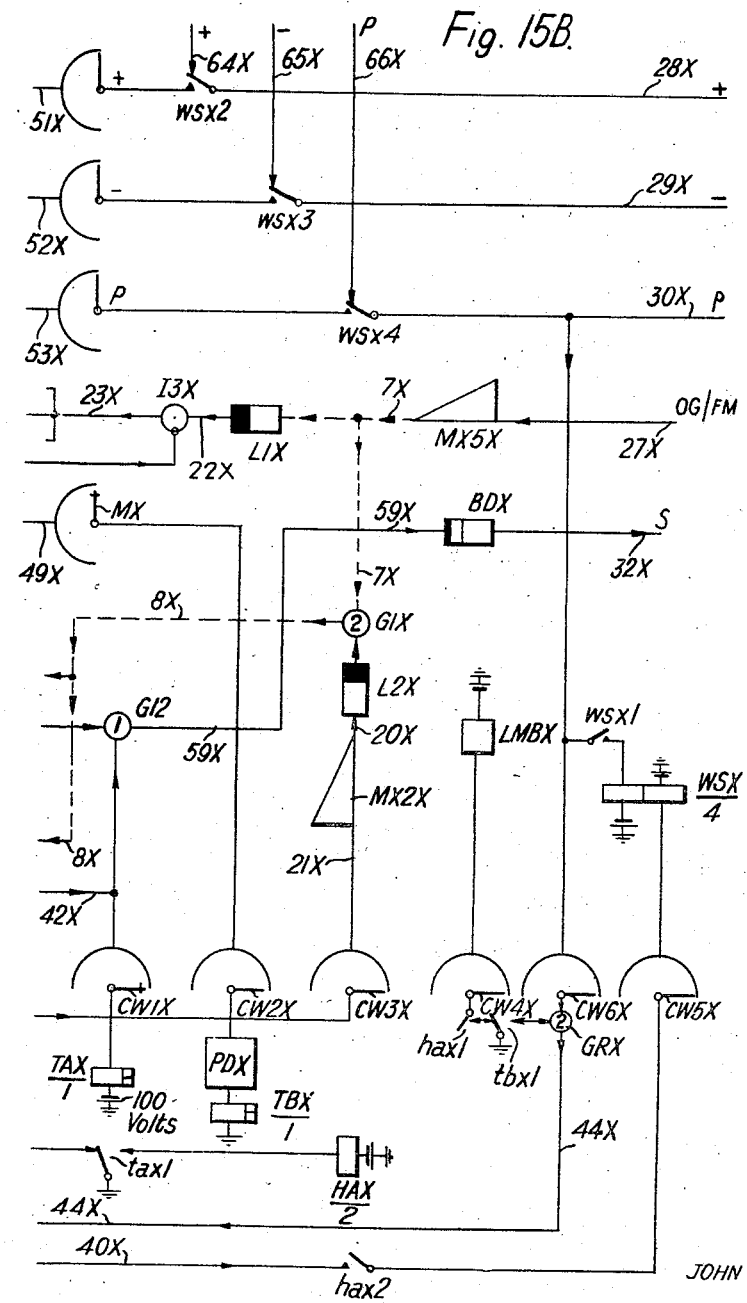

United States Patent Office 2,802,058
Patented Aug. 6, 1957

2,802,058

AUTOMATIC EXCHANGE SYSTEMS

John Edward Flood, Herne Hill, London, England, assignor to Siemens Brothers & Co. Limited, London, England, a British company Application November 29, 1955, Serial No. 549,806

5 Claims. (Cl. 179—18)

This invention relates to automatic exchange systems such as automatic telephone exchange systems.

For some years, automatic telephone exchange systems have been known in which through connections between calling circuits and called circuits over trains of switches are set up by a method in which a marker marks a called circuit and the marking condition is extended backwards over paths including every available path between this circuit and a calling circuit, a particular backward-marked path being then appropriated and a connection set up thereover by a selecting process in which a connection is extended forwards from the calling circuit over a train of switches.

In the exchange systems of the present invention, through connections between calling circuits and called circuits over trains of switches are set up by a method in which a marking condition in respect of a calling circuit is extended forwards over paths including every available path between this circuit and a called circuit, a particular forward-marked path being then appropriated by a selecting process in which a setting-initiating condition is extended backwards subsequent to the marking of the called circuit by a marker. It may be arranged that the lines of a group of lines such as a P. B. X or junction group of lines are spread over a number of groups of selectors, and that in the case of a call to such a group of lines the marker is furnished with an indication from each group of selectors which has a forward-marking extended to it and which includes a free selector having direct access to at least one free line of the group, and that in the case of such a call the marker makes a selection from amongst the indicated groups of selectors. It may further be arranged that the selection made by the marker in these circumstances is effected on the basis of an order of preference pertaining to the indicated groups of selectors.

The present invention finds especially advantageous applications in the case of automatic exchange systems in which the selectors associated with a marker and comprising selectors in a plurality of consecutive ranks are of an electro-mechanical nature (e. g. motor-driven uniselectors), but the scope of the invention is not limited to systems employing electro-mechanical selectors.

According to a main feature of the invention, there is provided an automatic exchange system wherein selectors are arranged to constitute one or more groups of selectors in each of two or more ranks, wherein each of the said groups has a common control circuit associated with it, and wherein an available path, for connecting a calling circuit to a called circuit marked by a marker and involving one selector in each rank and forward-marked by a register associated with the marker, is appropriated for the call concerned, as regards each selector involved, by electronic equipment in or associated with the common control circuit associated with the group to which the selector belongs, such electronic equipment including electronic storage circuits arranged to record the identities of the two terminal trunks associated with the selector which are included in the said available path and to control the setting of the selector to effect a through connection between these particular terminal trunks, and the forward-marking in respect of the call being terminated, and the marker being rendered available for use on another call, as soon as the electronic storage circuits concerned have recorded the identities of all the relevant terminal trunks included in the said available path.

According to a subordinate feature of the invention, a group of selectors has associated with it a common control circuit including a time-division-multiplex system the channels of which are allocated individually, for selection controlling purposes, to the terminal trunks pertaining to one side of the group, and the appropriation of a free and marked terminal trunk pertaining to the said side for a call is effected by the response of an electronic storage circuit to a pulse present on a pulse highway subsequent to the reception by this electronic storage circuit of an intimation that selection is to be effected, and the said intimation is timed so that the terminal trunk appropriated by the response of the storage circuit is such as to involve, in the existing circumstances, a minimum wiper movement of a uniselector serving to couple the master selector circuit concerned to the selectors of the group.

Figure 9A:
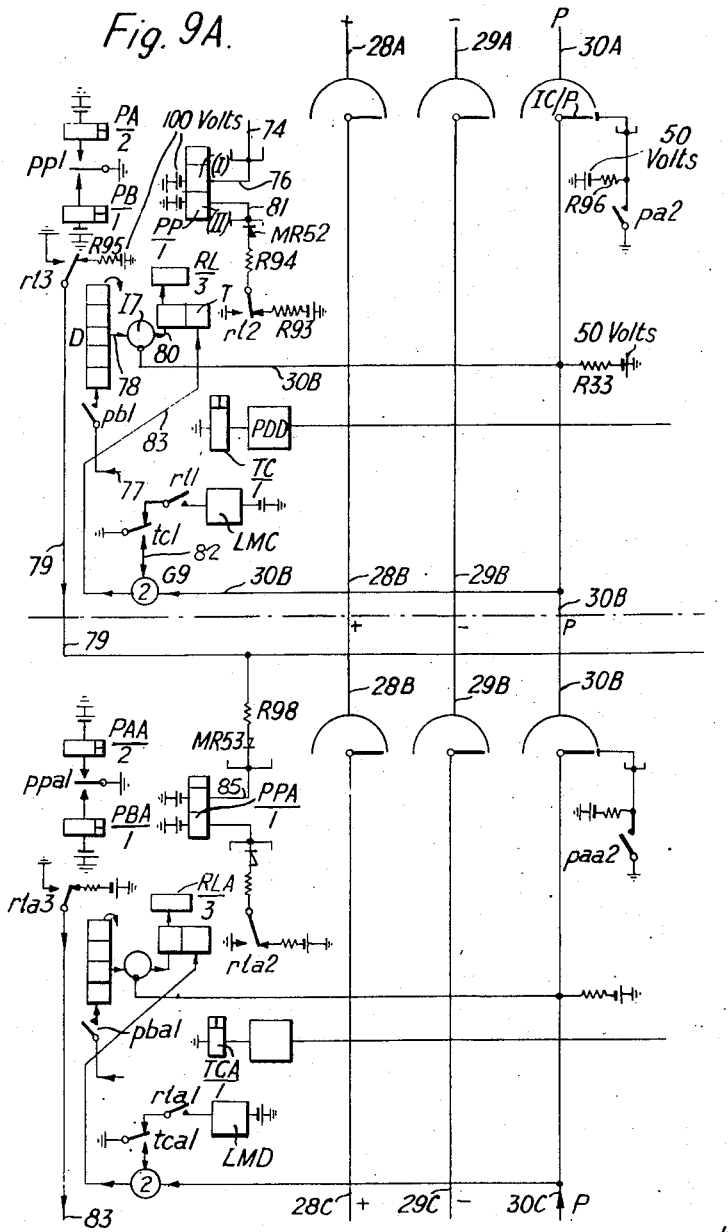
Figure 11:
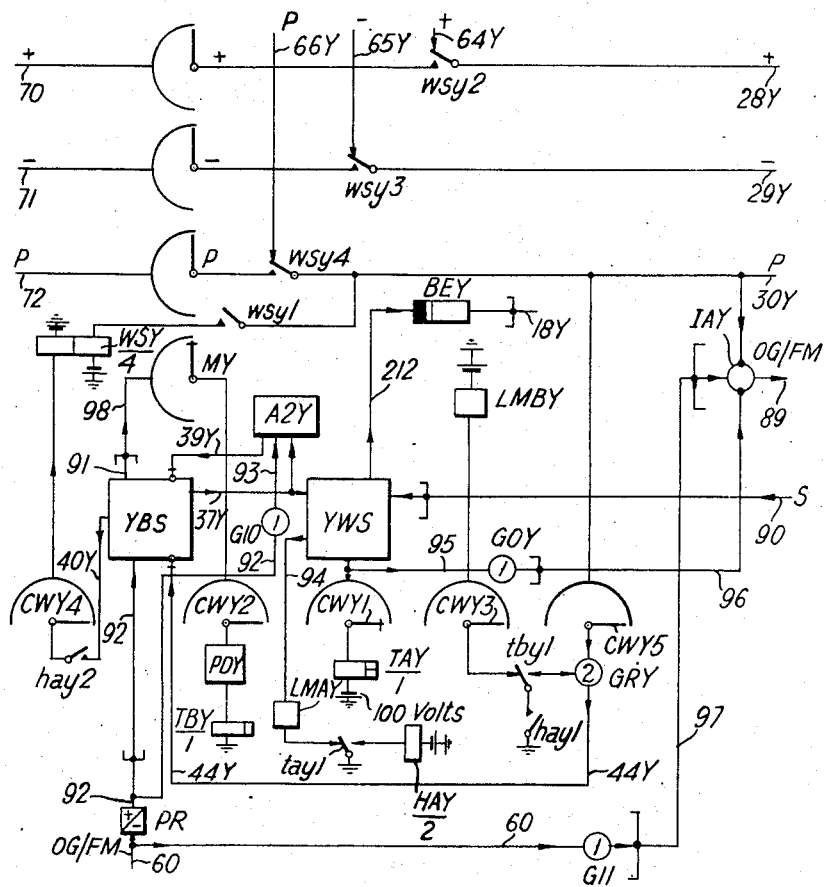
Figure 12:
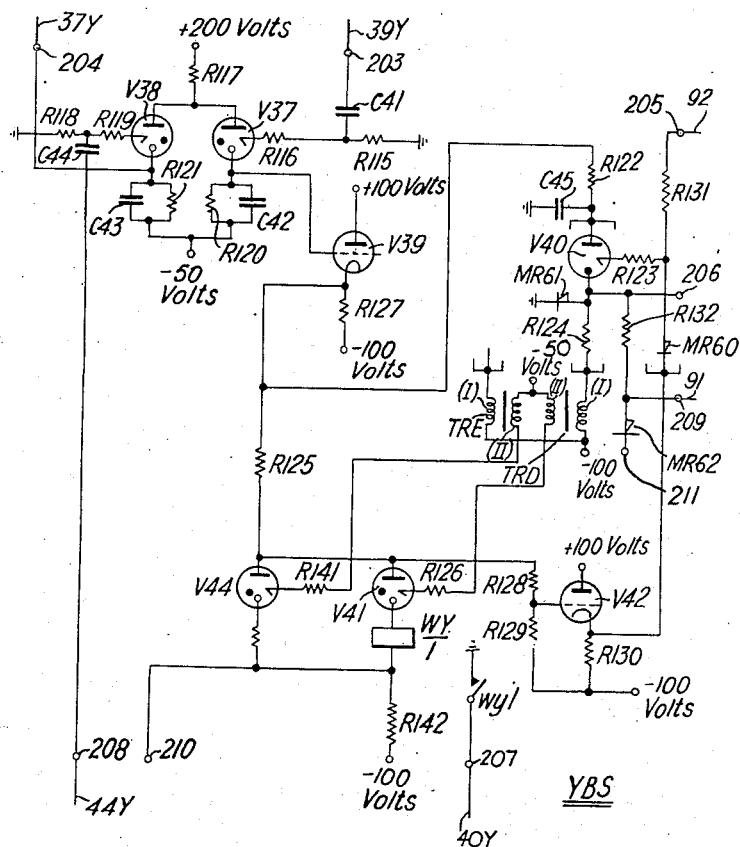
Figure 13:
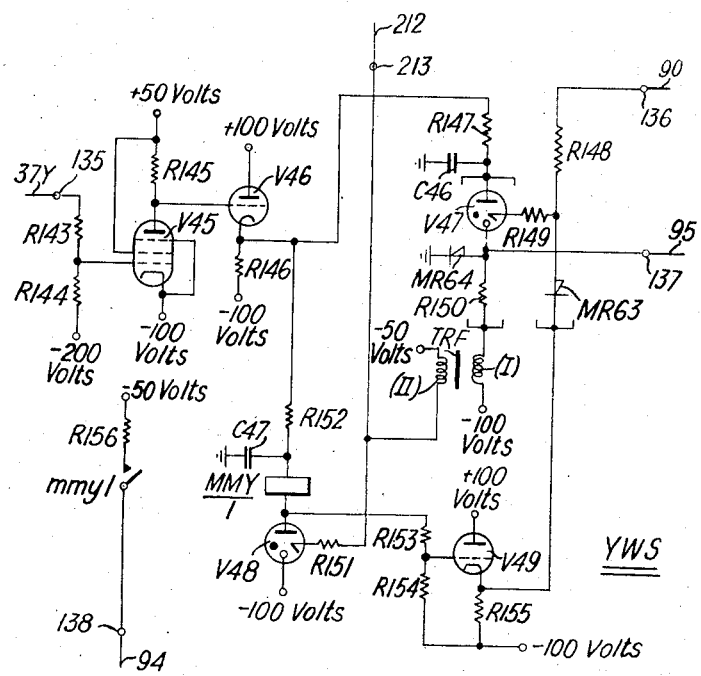
Figure 14:
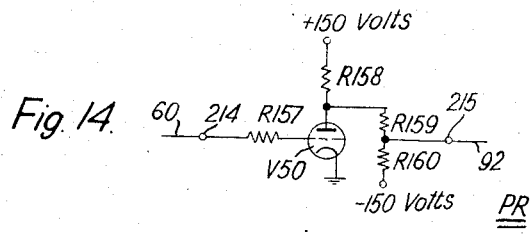
Figure 15A:
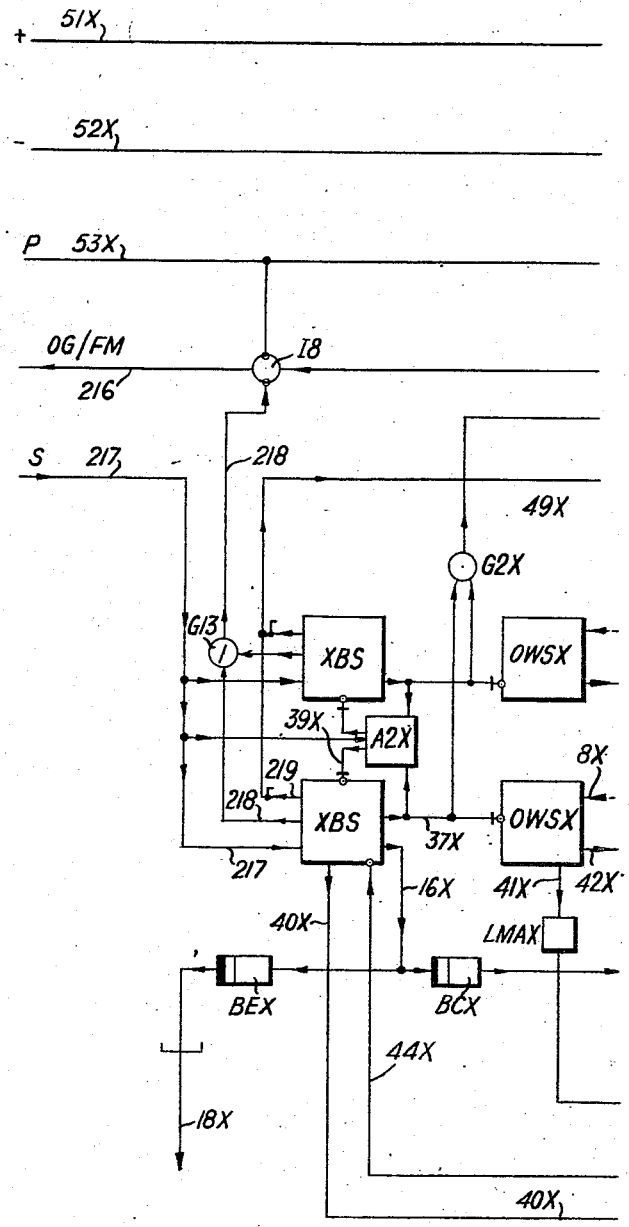

The above-mentioned and other features of the invention are exemplified in the specific selecting arrangements for a large (e. g. 10,000-line) automatic telephone exchange which will now be described with reference to the accompanying drawings. Fig. 1 of the drawings shows a schematic trunking diagram of the selecting and related arrangements concerned. Figs. 2A and 2B together constitute a circuit diagram showing the line circuit of a line connected to the exchange and a schematic circuit diagram of a primary selector and the common control circuit of the group of primary selectors to which this selector belongs. Figs. 3 to 7 inclusive show the forms which certain elements of the arrangements shown in Figs. 2A and 2B may take. Fig. 8 shows an incoming link circuit. Figs. 9A and 9B together constitute a schematic circuit diagram of a register secondary selector and the allotter common to the group of register secondary selectors to which this selector belongs, and of a register tertiary selector and the allotter common to the group of register tertiary selectors to which this selector belongs. Fig. 10 shows the forms which certain elements of the arrangements shown in Figs. 9A and 9B may take. Fig. 11 is a schematic circuit diagram of an incoming secondary selector and the common control circuit of the group of incoming secondary selectors to which this selector belongs. Figs. 12, 13, and 14 show the forms which certain elements of the arrangements shown in Fig. 11 may take. Figs. 15A and 15B together constitute a schematic circuit diagram of an intermediate selector and the common control circuit of the group of intermediate selectors to which this selector belongs.

The selecting and related arrangements concerned include groups of primary selectors, groups of incoming secondary selectors, groups of outgoing secondary selectors, groups of register secondary selectors, one or more groups of register tertiary selectors, and groups of intermediate selectors. All the selectors referred to are similar high-speed motor-driven uniselectors. Each has no normal position and has an individual driving electromotor the circuit of which is controlled in the well-known manner by a latch electromagnet. Each bank contact of a selector is multipled to the corresponding bank contacts of the other selectors of the group to which the selector belongs, so that a group bank multiple is constituted.

The wires of each such group bank multiple are directly connected to wires of, or are otherwise associated with, the common-to-group or bank-side terminal trunks of the group of selectors concerned. The wipers of a selector are directly connected to wires of, or are otherwise associated with, a single individual-to-selector or wiper-side terminal trunk of the selector.

Referring now to Fig. 1, this as has already been stated shows a schematic trunking diagram of the selecting and related arrangements concerned. In this diagram, PS represents any primary selector, ISS represents any incoming secondary selector, OSS represents any outgoing secondary selector, RSS represents any register secondary selector, RTS represents any register tertiary selector, and IS represents any intermediate selector. The wiper-side terminal trunks of these selectors are represented at 102, 104, 106, 108, 110, and 112 respectively, whilst 101, 103, 105, 107, 109, and 111 represent bank-side terminal trunks associated with the respective selectors. In addition to the groups of selectors referred to, the selecting and related arrangements concerned also include line circuits, incoming link circuits, and supervisory link circuits, and are for use in conjunction with a plurality of registers and a single common marker. The constitution and organisation of the supervisory link circuits and of the registers and of the common marker may be on known lines and do not form part of the present invention. In the trunking diagram, LC represents any line circuit, and ILC represents any incoming link circuit. To make the diagram complete and facilitate description, representations of a supervisory link circuit and of a register and of the common marker are included, SLC representing any supervisory link circuit and RG representing any register and MK representing the common marker. Since each of the terminal trunks associated with the register secondary selectors and the register tertiary selectors includes both an incoming set of line and private wires and an outgoing set of line and private wires, and each such selector when set has to provide through connections in respect of two such sets of wires, these trunks and selectors are represented in the trunking diagram as being made up of two sections. The incoming line and private wires are included in the sections 122, 120, 118, and 116, and the outgoing line and private wires are included in the sections 123, 121, 119, and 117. The uniselectors employed are such as to provide for 100 bank-side terminal trunks per group of register secondary selectors or register tertiary selectors, and 200 bank-side terminal trunks per group in the case of other selectors. Each group of primary selectors, incoming secondary selectors, outgoing secondary selectors, and intermediate selectors has a common control circuit which includes a number of master selector circuits. The bank-side terminal trunks 101 of each group of primary selectors PS are connected to the line circuits LC constituting a corresponding group of line circuits. Each primary selector PS serves, depending upon the circumstances in which it is taken into use, either as an incoming selector which hunts for a calling line or as an outgoing selector which hunts for a called line. The wiper-side terminal trunk 102 of each primary selector PS is connected by an inter-stage trunk 113 to a bank-side terminal trunk 105 of a group of outgoing secondary selectors OSS, and is also connected to the inlet of an incoming link circuit ILC which includes a switching relay (represented in the figure by a single change-over contact). This link circuit serves to link the primary selector wiper-side terminal trunk 102 to a bank-side terminal trunk 107 of a group of register secondary selectors RSS and, over back contacts of the switching relay, to a bank-side terminal trunk 103 of a group of incoming secondary selectors ISS. During periods in which the switching relay is operated, the last-mentioned terminal trunk, instead of being linked to the primary selector wiper-side terminal trunk 102, is linked to the register secondary selector group bank-side terminal trunk 107. The incoming secondary selectors ISS and the intermediate selectors IS are associated in pairs, the wiper-side terminal trunk 104 of each incoming secondary selector ISS being connected by an inter-stage trunk 114 to the wiper-side terminal trunk 112 of the associated intermediate selector IS. The wiper-side terminal trunk 106 of each outgoing secondary selector OSS is connected to the outlet of a supervisory link circuit SLC the inlet of which is connected to a bank-side terminal trunk 111 of a group of intermediate selectors IS. This link circuit serves to control and supervise a call set up over the outgoing secondary selector, and includes apparatus for this purpose. Each register tertiary selector RTS is individual to a register RG and has its wiper-side terminal trunk 110 connected to this register. The wiper-side terminal trunk 108 of each register secondary selector RSS is connected by an inter-stage trunk 115 to a bank-side terminal trunk 109 of a group of register tertiary selectors RTS. All the registers RG are served by the single common marker MK.

The general operation of the selecting arrangements as regards the setting up of a call between two lines connected to the exchange, and assuming that no congestion is encountered, is briefly as follows. The assumption of the calling condition by a line causes a forward-marking condition to exist on a forward-marking wire of the primary selector group bank-side terminal trunk 101 pertaining to the line. Provided that no condition preparatory to the setting up of a connection to the line already exists in the common control circuit of the group of primary selectors PS concerned, this common control circuit, in response to the appearance of the forward-marking condition on the said forward-marking wire and by means of electronic storage circuits included in a master selector circuit, records the identity of the particular bank-side terminal trunk 101 concerned, and selects and records the identity of a free wiper-side terminal trunk 102 of a selector of the group for use on the call, and brings about the application of a forward-marking condition to an incoming forward-marking wire of this wiper-side terminal trunk. The master selector circuit concerned then proceeds to bring about the setting of the relevant primary selector PS to effect a through connection between the bank-side terminal trunk concerned and the wiper-side terminal trunk. The forward-marking condition on the incoming forward-marking wire of the last-mentioned trunk is extended through, in the incoming link circuit ILC individual to the primary selector, to a forward-marking wire of the register secondary selector group bank-side terminal trunk 107 associated with this link circuit and to a start wire of an allotter common to the group of register secondary selectors RSS concerned. This allotter thereupon allots a free register secondary selector RSS, and the individual control circuit of this selector brings about the application of a forward-marking condition to an incoming forward-marking wire of the wiper-side terminal trunk 108 of this selector. The forward-marking condition thus applied is extended over the relevant inter-stage trunk 115 to an incoming forward-marking wire of the register tertiary selector group bank-side terminal trunk 109 associated with the wiper-side terminal trunk of the register secondary selector RSS concerned, from which wire it is further extended to a start wire of an allotter common to the group of register tertiary selectors RTS concerned. The last-mentioned allotter thereupon allots a free register tertiary selector RTS, and the individual control circuit of this selector brings about the application of a forward-marking condition to an incoming forward-marking wire of the wiper-side terminal trunk 110 of this selector, and hence to an incoming forward-marking wire in the free register RG connected to this terminal trunk. The individual control circuits of the allotted register secondary selector RSS and the allotted register tertiary selector RTS proceed to bring about the setting of the respective selectors to effect in the case of each of them a through connection between a forward-marked bank-side terminal trunk and the wiper-side terminal trunk. It will be clear from what has been said that a primary selector PS, a register secondary selector RSS, and a register tertiary selector RTS may all be in process of being set in respect of a call at the same time. When a primary selector PS, a register secondary selector RSS, and a register tertiary selector RTS have been set in respect of the call, the calling loop is extended through them to the register RG concerned, which has already been prepared for use by the application of the forward-marking condition to its incoming forward-marking wire. The register, in response to such application of the forward-marking condition and the extension of the calling loop, applies an engaging earth to an incoming private wire, operates the switching relay in the incoming link circuit ILC concerned, operates a switching relay associated with the register tertiary selector group bank-side terminal trunk 109 concerned, and reverts dialling tone to the calling line over incoming line wires. The engaging earth reaches the private wire of the relevant primary selector wiper-side terminal trunk 102 and causes the master selector circuit in the common control circuit of the group of primary selectors PS concerned to become free for attending to other calls. Upon receiving the dialled digits signifying the called line, the register RG concerned performs any translation required, and acquires the use of the marker MK as soon as it becomes available and transfers to it the necessary information. When it acquires the use the use of the marker MK, the register applies a forward-marking condition to an outgoing forward-marking wire. This outgoing forward-marking wire is extended, over the relevant register tertiary and register secondary selectors and over switching relay front contacts, to an outgoing forward-marking wire of the incoming secondary selector group bank-side terminal trunk 103 associated with the incoming link circuit ILC used on the call. In response to the appearance of the forward-marking condition on the last-mentioned outgoing forward-marking wire, the common control circuit of the group of incoming secondary selectors ISS concerned brings about the application of a forward-marking condition to an outgoing forward-marking wire of the wiper-side terminal trunk 104 of each free incoming secondary selector of the group, and records, by means of an electronic storage circuit included in a master selector circuit, the identity of the particular bank-side terminal trunk 103 concerned. As regards each incoming secondary selector wiper-side terminal trunk 104 affected, the forward-marking condition is extended, over the relevant inter-stage trunk 114, to an outgoing forward-marking wire of the wiper-side terminal trunk 112 of the intermediate selector IS associated with the incoming secondary selector wiper-side terminal trunk. In response to the extension of the forward-marking condition to intermediate selector wiper-side terminal trunks, the common control circuit of each group of intermediate selectors IS concerned brings about the application of a forward-marking condition to an outgoinging forward-marking wire of each free bank-side terminal trunk 111 of the group. As regards each intermediate selector group bank-side terminal trunk 111 affected, the forward-marking condition is extended through the relevant supervisory link circuit SLC to an outgoing forward-marking wire of the wiper-side terminal trunk 106 of the outgoing secondary selector OSS associated with this link circuit. In response to the extension of the forward-marking condition to outgoing secondary selector wiper-side terminal trunks, the common control circuit of each group of outgoing secondary selectors OSS concerned brings about the application of a forward-marking condition to an outgoing forward-marking wire of each free bank-side terminal trunk 105 of the group. As regards each outgoing secondary selector group bank-side terminal trunk 105 affected, the forward-marking condition is extended, over the relevant inter-stage trunk 113, to an outgoing forward-marking wire of the wiper-side terminal trunk 102 of the primary selector PS associated with the outgoing secondary selector group bank-side terminal trunk. The result of this forward-marking process is that the forward-marking condition is extended to the outgoing forward-marking wire of each primary selector wiper-side terminal trunk 102 accessible to the calling line. At the same time as the register RG concerned applies the forward-marking condition to an outgoing forward-marking wire in respect of the call, the marker MK applies a backward-marking condition to a backward-marking wire of the primary selector group bank-side terminal trunk 101 associated with the called line. Provided that the called line is free and that the forward-marking condition is extended to the outgoing forward-marking wire of the wiper-side terminal trunk 102 of at least one free selector of the group of primary selectors PS concerned, the common control circuit of this group responds to the application of the backward-marking condition by reverting a "connection can be made" signal to the marker MK. Upon receiving this signal, the marker MK applies a setting-initiating condition to a "connect" wire individual to the last-mentioned common control circuit. In response to the appearance of the setting-initiating condition on the said "connect" wire, this common control circuit, by means of electronic storage circuits included in a master selector circuit, records the identity of the particular bank-side terminal trunk 101 concerned, and selects and records the identity of a wiper-side terminal trunk 102 having the forward-marking condition on its outgoing forward-marking wire and pertaining to a free primary selector PS of the group concerned, and brings about the application of a setting-initiating condition for a brief period to a setting wire of the selected wiper-side terminal trunk 102. The last-mentioned setting-initiating condition is extended, over the relevant inter-stage trunk 113, to a setting wire of the outgoing secondary selector group bank-side terminal trunk 105 associated with the primary selector PS concerned. In response to this extension of the setting-initiating condition, the common control circuit of the group of outgoing secondary selectors OSS concerned, by means of electronic storage circuits included in a master selector circuit, records the identity of the particular bank-side terminal trunk 105 concerned, and selects and records the identity of a wiper-side terminal trunk 106 having the forward-marking condition on its outgoing forward-marking wire and pertaining to a free outgoing secondary selector OSS of the group concerned, and brings about the application of a setting-initiating condition for a brief period to a setting wire of the selected wiper-side terminal trunk 106. The last-mentioned setting-initiating condition is extended through the relevant supervisory link circuit SLC to a setting wire of the intermediate selector group bank-side terminal trunk 111 associated with this link circuit. In response to this extension of the setting-initiating condition, the common control circuit of the group of intermediate selectors IS concerned, by means of electronic storage circuits included in a master selector circuit, records the identity of the particular bank-side terminal trunk 111 concerned, and selects and records the identity of a wiper-side terminal trunk 112 having the forward-marking condition on its outgoing foward-marking wire and pertaining to a free intermediate selector IS of the group concerned, and brings about the application of a setting-initiating condition for a brief period to a setting wire of the selected wiper-side terminal trunk 112. The last-mentioned setting-initiating condition is extended, over the relevant inter-stage trunk 114, to a setting wire of the wiper-side terminal trunk 104 of the incoming secondary selector ISS associated with the intermediate selector IS concerned. In response to this extension of the setting-initiating condition, the common control circuit of the group of incoming secondary selectors ISS concerned, by means of an electronic storage circuit included in the same master selector circuit as the electronic storage circuit set to record the identity of the particular incoming secondary selector group bank-side terminal trunk 103 involved in the call, records which particular wiper-side terminal trunk 104 is concerned. Each master selector circuit affected as a result of the application of the setting-initiating condition by the marker MK to the "connect" wire of the common control circuit of the relevant group of primary selectors PS, as soon as it is set, applies a master-selector-set condition for a brief period to a master-selector-set wire which is extended to the marker MK over a wire common to all the master selector circuits of the selecting stage concerned, and proceeds to bring about the setting of the relevant selector of the group concerned to effect a through connection between the wiper-side terminal trunk of the selector and the relevant bank-side terminal trunk. A primary selector PS, an outgoing secondary selector OSS, an intermediate selector IS, and an incoming secondary selector ISS may therefore all be in process of being set in respect of the call at the same time. As soon as the marker MK has received a master-selector-set condition on the master-selector-set wire for each selecting stage concerned, the register RG concerned removes the forward-marking condition from its outgoing forward-marking wire, and the marker MK is released and becomes free to attend to other calls. When an outgoing pair of line wires of the register concerned become connected through over the relevant register tertiary selector RTS, register secondary selector RSS, incoming link circuit switching relay front contacts, incoming secondary selector ISS, and intermediate selector IS to the supervisory link circuit SLC concerned, this link circuit applies a holding earth to the private wire incoming to it and to the private wire outgoing from it, with the consequence that each master selector circuit concerned is freed for use on other calls as soon as it has performed its setting function and the relevant private wire has been extended to the selector set by it. The called line is rung from the supervisory link circuit SLC concerned, which reverts ringing tone towards the register RG concerned. This register responds to the receipt of ringing tone by releasing itself from the connection and releasing the switching relay of the incoming link circuit ILC used on the call. The line wires extending to the calling line and the private wire extending towards this line thereupon become connected through in this incoming link circuit ILC to the corresponding wires of the relevant incoming secondary selector group bank-side terminal trunk 103 and thence to the incoming side of the relevant supervisory link circuit SLC. Further control and supervision of the call is thereafter vested in this supervisory link circuit.

In the case of a call to a P. B. X or junction group of lines, the marker MK, instead of applying a backward-marking condition to a backward-marking wire associated with one line as just described, applies a backward-marking condition to the relevant backward-marking wires associated with all the lines of the group. As regards their connection to primary selector group bank-side terminal trunks 101, the lines of a P. B. X or junction group of lines may be spread over a number of groups of primary selectors PS, and the marker MK may therefore receive in respect of one call a "connection can be made" signal from a number of common control circuits of groups of primary selectors. It is arranged that when this happens the marker MK makes a selection and applies a setting-initiating condition to the "connect" wire individual to one of the common control circuits. It may be arranged that the selection just mentioned is effected on the basis that a group of primary selectors PS associated with a first choice line or junction is preferred.

Referring now to Figs. 2A and 2B, these when placed side by side with Fig. 2B to the right of Fig. 2A together constitute a circuit diagram showing the line circuit LC (Fig. 1) of a line connected to the exchange and a schematic circuit diagram of a primary selector PS (Fig. 1) and the common control circuit of the group of primary selectors to which this selector belongs, this schematic circuit diagram being of the so-called functional type.

The line circuit is that part of Fig. 2A which is included in the chain-line rectangle LCD, and has through positive and negative line wires. The positive line wire 51 of the line circuit is directly connected on the exchange side (the right-hand side as shown) to a corresponding line wire of the primary selector group bank-side terminal trunk pertaining to the line, and is connected to earth over a first line resistor R1 and to a forward-marking wire 4 over a first control resistor R3. The negative line wire 52 is directly connected on the exchange side to a corresponding line wire of the primary selector group bank-side terminal trunk and is connected to negative battery (50 volts negative) over a second line resistor R2. On the line side (the left-hand side as shown), the positive line wire 51 and the negative line wire 52 are of course connected to the corresponding line wires of the line concerned. The line circuit has a private or "P" wire 53 which is directly connected to a private wire of the primary selector group bank-side terminal trunk, and which is connected to earth over a control rectifier U and meter SM in series, the rectifier being a dry-plate one connected to permit operation of the meter in response to a positive battery condition on the private wire. In addition to these connections, the private wire 53 is directly connected to a busy-marking wire 53A, and is connected to negative battery over the primary winding I of an impulse-generating transformer TR and a second control resistor R4 in series and to a source of "class of service" tone over a third control resistor R5, terminal CS being cross-connected to an appropriate source. The forward-marking wire 4 is directly connected to a forward-marking wire of the primary selector group bank-side terminal trunk, and is connected to the cathode of a cold-cathode gas-filled diode N through the secondary winding II of the impulse-generating transformer TR. The anode of this diode is connected to positive battery (50 volts positive). The busy-marking wire 53A is directly connected to a busy-marking wire of the primary selector group bank-side terminal trunk. When the line assumes the calling condition, the resulting current through the two line resistors R1 and R2 and the calling loop produces a voltage drop across the first line resistor R1 and therefore causes a forward-marking condition (10 or more volts negative) to exist on the forward-marking wire 4. When, as a result of this forward-marking condition, the line and private wires 51, 52, and 53 become connected through to a register, the register if necessary records the information given by the "class of service" tone extended to it over the through private wire and then applies a holding and busy-marking condition to this wire by earthing it. The busy-marking condition is extended to the busy-marking wire 53A and thereby renders the forward-marking condition on the forward-marking wire 4 ineffective. Subsequent to the disconnection of the register, the holding and busy-marking condition is maintained on the through private wire for the duration of the call by the supervisory link circuit used on the call. When the line is the called line of a connection, a forward-marking condition is caused to exist on the forward-marking wire 4 as soon as the line is looped in respect of the call, but is rendered ineffective in this case also by a busy-marking condition extended to the busy-marking wire 53A. In the case where, after the line assumes the calling condition, dialling is unduly delayed after the reversion of dialling tone from the register taken into use, the register after measuring off a delay period removes the earth holding and busy-marking condition from the through private wire. In response to the fall of current through its primary winding I which results from such removal of earth from the through private wire, the impulse-generating transformer TR produces in its secondary winding II a voltage impulse which serves to strike the cold-cathode gas-filled diode N. When thus started, the discharge through the diode N is sustained until the calling loop is opened, and gives a visible indication of the permanent loop condition of the line and serves to change the potential of the forward-marking wire 4 so that the forward-marking condition no longer exists on this wire. In this way, a permanent loop condition is prevented from holding selectors and a register out of use. In the case where the line is the calling line of a call and the called line clears first and clearing by the calling line is unduly delayed, the supervisory link circuit used on the call removes the earth holding and busy-marking condition from the through private wire after a delay period, causing the cold-cathode gas-filled diode N to strike with the results just set forth.

Still referring to Figs. 2A and 2B, the schematic circuit diagram of a primary selector and its associated common control circuit is of course that part of the diagram constituted by these figures which lies outside the chain-line rectangle LCD. Each primary selector has two sets of positive and negative line wipers and private wipers, and has one marking wiper M. For simplicity, only one set of positive line and negative line and private wipers is shown in the schematic circuit diagram, the private wiper of this set being the wiper designated P. The positive line and negative line and private wipers of the other set are connected to wires 64, 65, and 66 respectively. The individual circuit of each primary selector includes a wiper-choosing relay WS which by its condition determines, by means of its contacts ws2, ws3, and ws4, whether the line and private wipers of one or the other set are connected to the respective corresponding wires of the wiper-side terminal trunk of the selector. In addition to the positive and negative line wires 28 and 29 and the private or "P" wire 30, this trunk comprises an incoming forward-marking or "IC/FM" wire 57, an outgoing forward-marking or "OG/FM" wire 27, and a setting or "S" wire 32. Each primary selector has allocated to it, for selection controlling purposes, an individual channel of a time-division-multiplex system local to the common control circuit and hereinafter called the wiper-side time-division-multiplex system. A bank-side terminal trunk of the group of primary selectors, as well as including the positive and negative line wires 51 and 52 and the private or "P" wire 53, which are directly connected to the respective corresponding wires of the group bank multiple, also includes a forward-marking or "FM" wire 4, a busy-marking wire 53A, and a backward-marking or "BM" wire 10. Each such terminal trunk has allocated to it, for selection controlling purposes, an individual channel of a further time-division-multiplex system local to the common control circuit. This system will hereinafter be called the bank-side time-division-multiplex system, and is a 200-channel one. Each of the time-division-multiplex systems referred to comprises a plurality of pulse highways on which pulse trains (or, in some cases, single pulses) pertaining to different channels appear from time to time as is requisite for selection controlling purposes, the pulses pertaining to a channel occupying time positions which recur periodically and are individual to the channel, and such time positions pertaining to the different channels being interlaced. The wiper-side time-division-multiplex system includes a free-marking multiplex MX6, an outgoing forward-marking multiplex MX5, and a setting multiplex MX2, and the bank-side time-division-multiplex system includes an incoming forward-marking multiplex MX1, a busy-marking multiplex MX3, and a backward-marking multiplex MX4. Each of these multiplexes has an input wire per channel. Each has an output pulse highway, and serves to produce on this highway, in response to the presence of the relevant condition on an input wire, the pulse train pertaining to the channel to which this input wire corresponds. The common control circuit includes a number of incoming master selector circuits and a number of outgoing master selector circuits. For simplicity, only one of the master selector circuits, an outgoing one, and parts of another, an incoming one, are represented in the schematic circuit diagram. Each master selector circuit has individual to it a coupling switch for coupling the master selector circuit to the individual circuit of any primary selector of the group in order to enable the primary selector to be set under the control of the master selector circuit. The coupling switches are high-speed motor-driven uniselectors similar to the primary and other selectors. Wipers CW1, CW2, CW3, CW4, CW5, and CW6 are the wipers of the coupling switch pertaining to the outgoing master selector circuit which is fully represented in the schematic circuit diagram. The allocation of the channels of the wiper-side time-division-multiplex system to the primary selectors of the group is such that the channels, if taken in the cyclic order of occurrence of the respective time positions pertaining thereto in one complete cycle of such time positions, pertain respectively to the primary selectors arranged in the cyclic order in which the wipers of each master selector coupling switch when rotated make contact with the respective sets of bank contacts associated with these selectors, corresponding contacts in the banks of the different coupling switches being associated with the same primary selector. The outgoing forward-marking wire 27 of the wiper-side terminal trunk of a primary selector is linked by an outgoing forward-marking gate IA with the respective input wire 47 of the outgoing forward-marking multiplex MX5. Each input wire 31 of the free-marking multiplex MX6 is linked by a free-marking gate IB, individual to the respective primary selector, with a "register free" control wire 130 common to the exchange. As long as there is a free register, a free-marking condition (20 volts negative) exists on the "register free" control wire 130 which causes the free-marking multiplex MX6 to produce on its output pulse highway 25 the pulse train pertaining to each primary selector which has its free-marking gate IB open. The outgoing forward-marking gate IA and the free-marking gate IB of a primary selector are closed, to block the extension of the relevant conditions (forward-marking and free-marking), during periods in which the private wire 30 of the wiper-side terminal trunk of the selector is earthed and during periods in which a master selector circuit is marking the selector. The input wires, corresponding to a bank-side terminal trunk, of the incoming forward-marking multiplex MX1, the busy-marking multiplex MX3, and the backward-marking multiplex MX4 constitute respectively the forward-marking wire 4, busy-marking wire 53A, and backward-marking wire 10 of the trunk. The common control circuit includes an electronic incoming allotter A1 which serves to predetermine which free incoming master selector circuit is to be used next, and an electronic outgoing allotter A2 which serves to allot a free outgoing master selector circuit for use on a call. The incoming allotter A1 has an allocation wire 38 for each incoming master selector circuit, and the outgoing allotter A2 has an allocation wire 39 for each outgoing master selector circuit. The outgoing allotter A2 has an input wire constituted by the "connect" wire 48 of the common control circuit. The output pulse highway 5 of the incoming forward-marking multiplex MX1 is connected over an incoming bank-side pulse-selection gate I5 to an incoming bank-side selection pulse highway 6. The incoming bank-side pulse-selection gate I5 is arranged to block the extension over it, to the pulse highway 6, of the pulse train pertaining to any bank-side terminal trunk in respect of which the busy-marking multiplex MX3 is producing the corresponding pulse train on the output pulse highway 9 of this multiplex, or in respect of which a master selector circuit is producing the corresponding pulse train on a pulse highway 13. During a period in which the common control circuit is reverting a "connection can be made" signal (i. e. a 20 volts negative condition) to the marker over a signal wire 24 connected to the marker, the incoming bank-side pulse-selection gate I5 is completely closed. The output pulse highway 11 of the backward-marking multiplex MX4 is connected to a main backward-marking pulse highway 12 over a pulse-controlled backward-marking gate I6 which is arranged to block the extension over it, to the pulse highway 12, of the pulse train pertaining to any bank-side terminal trunk in respect of which the busy-marking multiplex MX3 is producing the corresponding pulse train or in respect of which the incoming forward-marking multiplex MX1 is producing the corresponding pulse train. The main backward-marking pulse highway 12 is connected over an outgoing bank-side pulse-selection gate G8 to an outgoing bank-side selection pulse highway 17. The pulse highway 12 is linked to an input wire 43 of a controlling gate G7 by a pulse lengthener L3. The outgoing bank-side pulse-selection gate G8 is arranged to block the extension over it, to the highway 17, of the pulse train pertaining to any bank-side terminal trunk in respect of which a master selector circuit is producing the corresponding pulse train on the pulse highway 13, and is in any case closed except whilst the marker is applying the setting-initiating condition (earth) to the "connect" wire 48 of the common control circuit. Each master selector circuit includes two electronic storage circuits, a bank-side storage circuit IBS, OBS and a wiper-side storage circuit IWS, OWS. The bank-side storage circuit IBS, OBS serves to record, in respect of a call for which the master selector circuit is taken into use, the identity of the particular bank-side terminal trunk concerned. The wiper-side storage circuit IWS, OWS serves to record, in respect of a call for which the master selector circuit is taken into use, the identity of the wiper-side terminal trunk concerned or, in other words, which particular primary selector is to be set under the control of the master selector circuit. The bank-side storage circuit IBS of each incoming master selector circuit has an input circuit connected to the incoming bank-side selection pulse highway 6, and the bank-side storage circuit OBS of each outgoing master selector circuit has an input circuit connected to the outgoing bank-side selection pulse highway 17. Each bank-side storage circuit IBS, OBS has a marking output wire 55, 56 individual to each of the 200 channels of the bank-side time-division-multiplex system, and, when set in response to a pulse present on the relevant bank-side selection pulse highway 6, 17, produces a marking condition, peculiar to the master selector circuit concerned, on the marking output wire corresponding to the particular channel, and bank-side terminal trunk, to which this pulse pertains. The last-mentioned marking condition is a negative potential condition, the magnitude of the negative potential being less than 100 volts and being peculiar to, and indicative of, the particular master selector circuit. Each marking output wire 55, 56 of the bank-side storage circuits is connected to the respective wire 49, corresponding to the relevant bank-side terminal trunk, of the 100 wires of the group bank multiple which are connected to the bank contacts associated with the marking wipers M of the primary selectors of the group. Each bank-side storage circuit IBS, OBS, when set in response to a pulse present on the relevant bank-side selection pulse highway 6, 17, produces a relay-operating condition (earth) on a single wiper-choosing output wire 40, individual to the master selector circuit concerned, if the bank-side terminal trunk to which this pulse pertains is one such that operation of the wiper-choosing relay WS of the relevant primary selector individual circuit is required, and produces the pulse train pertaining to this trunk on a pulse highway 14 (in the case of an incoming bank-side storage circuit) or 15 (in the case of an outgoing bank-side storage circuit). The pulse highways 14 and 15 are linked to the pulse highway 13 by an isolating gate G4 so that a pulse train on either of the highways 14 and 15 serves to exert the requisite control of the incoming and outgoing bank-side pulse-selection gates I5 and G8. Each bank-side storage circuit IBS, OBS, when set, produces a steady setting condition (20 or more volts negative) on a setting output wire 36, 37 which is connected so that the existence of the steady setting condition on it serves to intimate to the relevant electronic allotter A1, A2 of the common control circuit that the particular master selector concerned has been taken into use for a call, and serves to prepare the wiper-side storage circuit IWS, OWS of this master selector circuit for operation in respect of the call. In the case of the bank-side storage circuit OBS of an outgoing master selector circuit, the setting output wire 37 is connected to constitute an input wire of a controlling gate G2. This controlling gate has an input wire for each master selector circuit, and is arranged to produce a gate-closing condition (to close a further controlling gate I3) when the condition obtains that the steady setting condition exists on the setting output wires 37 of the bank-side storage circuits of all the outgoing master selector circuits. Each bank-side storage circuit IBS, OBS, when set, produces a steady storage-circuit-set condition (earth, or a potential near earth potential) on a single storage-circuit-set output wire 16 which is coupled by a differentiating circuit element BC to the setting wiper CW3 of the coupling switch of the relevant master selector circuit, and which is coupled by a further differentiating circuit element BE, individual to the master selector circuit, to the primary selector master-selector-set wire 18. As regards each primary selector of the group, the corresponding input wire 21 of the setting multiplex MX2 is connected to the contact corresponding to the selector in the banks of the setting wipers CW3 of the coupling switches of the master selector circuits. The output pulse highway 25 of the free-marking multiplex MX6 is connected over an incoming wiper-side pulse-selection gate G5 to an incoming wiper-side selection pulse highway 26. The incoming wiper-side pulse-selection gate G5 is closed during a period in which the common control circuit is reverting a "connection can be made" signal to the marker over the signal wire 24 and is in any case closed except whilst the setting multiplex MX2 is producing pulses on its output pulse highway 20. The output pulse highway 7 of the outgoing forward-marking multiplex MX5 is connected over an outgoing wiper-side pulse-selection gate G1 to an outgoing wiper-side selection pulse highway 8. The pulse highway 7 is linked to an input wire 23 of the controlling gate G7 by a pulse lengthener L1 and the controlling gate I3. The outgoing wiper-side pulse-selection gate G1 is closed except whilst the setting multiplex MX2 is producing pulses on its output pulse highway 20. The pulse highway 20 is connected to a setting pulse lengthener L2 having an output wire 19 which constitutes a control wire of the gates G5 and G1 and on which a gate-opening condition (100 volts positive) is produced whenever pulses exist on the pulse highway. The wiper-side storage circuit IWS of each incoming master selector circuit has an input circuit connected to the incoming wiper-side selection pulse highway 26, and the wiper-side storage circuit OWS of each outgoing master selector circuit has an input circuit connected to the outgoing wiper-side selection pulse highway 8. Each wiper-side storage circuit IWS, OWS has a marking output wire 35, 42 individual to each channel of the wiper-side time-divisionmultiplex system, and, when set in response to a pulse present on the relevant wiper-side selection pulse highway 26, 8, produces a marking condition (earth) on the marking output wire corresponding to the particular channel, and primary selector, to which this pulse pertains. Each marking output wire 35, 42 of the wiper-side storage circuits is connected to the particular bank contact which pertains to the individual circuit of the relevant primary selector in the bank of a marking wiper CW1 of the coupling switch of the master selector circuit to which the storage circuit belongs. In the case of the wiper-side storage circuit IWS of an incoming master selector circuit, each marking output wire 35 is so coupled to the incoming forward-marking wire 57 of the wiper-side terminal trunk of the relevant primary selector, by means of an isolating gate GI individual to the marking output wire, that a marking condition (earth) on the marking output wire produces a forward-marking condition (earth) on the incoming forward-marking wire. In the case of the wiper-side storage circuit OWS of an outgoing master selector circuit, each marking output wire 42 is so coupled to the setting wire 32 of the wiper-side terminal trunk of the relevant primary selector, by means of an isolating gate GO individual to the marking output wire and a differentiating circuit element BD individual to the setting wire, that the appearance of a marking condition (earth) on the marking output wire brings about the application of a setting-initiating condition (earth) for a brief period to the setting wire. In the case of each master selector circuit, each marking output wire 35, 42 of the wiper-side storage circuit is connected so that the existence of the marking condition on it serves to bring each of the two gates IA and IB individual to the relevant primary selector to the condition in which the extension of the relevant marking condition is blocked. Each marking output wire 35, 42 of a wiper-side storage circuit is associated with the pair of outgoing forward-marking and free-marking gates IA and IB individual to the relevant primary selector by means of the relevant isolating gate already mentioned GI, GO and a further isolating gate GC individual to the primary selector. Each wiper-side storage circuit IWS, OWS, when set in response to a pulse present on the relevant wiper-side selection pulse highway 26, 8, connects an output wire 41, individual to the storage circuit, to a source of energising potential (50 volts negative) for the latch electromagent LMA of the coupling switch of the master selector circuit concerned, with the result that this electromagnet is energised unless or until a high-speed electromagnetic coupling switch test relay TA associated with this coupling switch is operated. The coupling switch test relay TA of a master selector circuit is operated over the marking wiper CW1 of the coupling switch when this wiper encounters the marking condition (earth) on a contact in its bank. Each master selector circuit includes a high-speed electromagnetic selector-setting test relay TB. This relay has a control circuit which includes a potential detector PD and which serves to operate the relay when, and only when, the marking condition (negative potential condition) peculiar to the master selector circuit appears on the marking wiper M of the primary selector to which the master selector circuit is coupled by its coupling switch. Each master selector circuit includes an auxiliary relay HA which is operated upon the operation of the coupling switch test relay TA. The couplings between a master selector circuit and the individual circuit of a primary selector which the coupling switch of the master selector circuit provides include one over which the operating winding I of the wiper-choosing relay WS of the primary selector is energised when necessary, and one over which the latch electromagnet LMB of the primary selector is energised if necessary over a make contact ha1 of the auxiliary relay and a back contact tb1 of the selector-setting test relay. The circuit for energising the operating winding I of the wiper-choosing relay WS of a primary selector when necessary includes a make contact ha2 of the auxiliary relay of the master selector circuit. The couplings just referred to also include one between a control wire 45 of a resetting circuit of the master selector circuit and the private wire 30 of the wiper-side terminal trunk concerned. This resetting circuit includes a gate GR and is arranged so that the bank-side storage circuit and therefore the remainder of the master selector circuit is restored to normal when the private wire 30 of the wiper-side terminal trunk assumes the earth holding and busy-marking condition subsequent to the operation of the selector-setting test relay TB of the master selector circuit. The constitution and organisation of the elements MX1, MX2, MX3, MX4, MX5, MX6, L1, L2, L3, GC, GI, GO, GR, G1, G2, G5, G7, G8, BD, IA, IB, I3, I5, and I6 shown schematically in Figs. 2A and 2B may be on known lines and do not form part of the present invention. Forms which the elements A1, A2, IBS, OBS, BC, BE, IWS, OWS, and PD may conveniently take are shown in Figs. 3 to 7 inclusive and will be described later in this specification.

When the line associated with a bank-side terminal trunk of the group of primary selectors assumes the calling condition, thereby causing a forward-marking condition (10 or more volts negative) to exist on the forward-marking wire 4 of the trunk, the incoming forward-marking multiplex MX1 of the common control circuit produces on its output pulse highway 5 the pulse train pertaining to the trunk. The first fully effective pulse of this train to be extended (assuming that no condition exists to cause the incoming bank-side pulse-selection gate I5 to block such extension) to the incoming bank-side selection pulse highway 6 brings about the immediate setting of the bank-side storage circuit IBS of the particular incoming master selector circuit which is at the time the one preselected and prepared by the incoming allotter A1. The consequent appearance of the steady setting condition (20 or more volts negative) on the setting output wire 36 of this storage circuit causes the wiper-side storage circuit IWS of the same master selector circuit to be set by the first pulse present on the incoming wiper-side selection pulse highway 26 subsequent to this appearance of the steady setting condition, with the result that a marking condition (earth) is produced on the marking output wire 35 corresponding to the wiper-side terminal trunk to which this pulse pertains. As a consequence of this, a forward-marking condition (earth in this case) is produced on the incoming forward-marking wire 57 of the relevant wiper-side terminal trunk. The first pulse present (as just referred to) on the selection pulse highway 26 is present by reason of the fact that the bank-side storage circuit IBS of the incoming master selector circuit concerned, when set, produces the steady storage-circuit-set condition on the storage-circuit-set output wire (corresponding to wire 16 of storage circuit OBS) of this storage circuit, with the result that the relevant differentiating circuit element connected to this wire applies a setting-initiating condition (earth) for a brief period to the setting wiper of the coupling switch of the master selector circuit and thereby brings about the opening of the incoming wiper-side pulse-selection gate G5. The opening of the pulse-selection gate G5 results from the fact that the setting-initiating condition, extended to an input wire 21 of the setting multiplex MX2 over the setting wiper of the coupling switch, causes this multiplex to produce on its output pulse highway 20 the pulse train pertaining to the primary selector to which this input wire belongs. This pulse train causes, through the medium of the setting pulse lengthener L2, the gate G5 to be opened on the occurrence of the first effective pulse of the train. Thus the pulse train which causes the incoming wiper-side pulse-selection gate G5 to be opened pertains to the primary selector associated with the position in which the wipers of the relevant coupling switch happen to be standing when the setting-initiating condition appears on the setting wiper of this switch. It follows, by reason of the method of allocation of the channels of the wiper-side time-division-multiplex system, that the first pulse present on the incoming wiper-side selection pulse highway 26 subsequent to the appearance of the steady setting condition on the setting output wire 36 of the bank-side storage circuit IBS of the master selector circuit concerned is a pulse, if two or more pulse trains exist on the output pulse highway 25 of the free-marking multiplex MX6 at the time, of that one of these two or more trains which pertains to that one of the two or more corresponding primary selectors which is associated with that one of the two or more corresponding wiper positions which is reached first by the coupling switch wipers when these are driven from the position in which they happen to be standing. As a consequence of the setting of the bank-side storage circuit IBS and the wiper-side storage circuit IWS of the incoming master selector circuit concerned, the coupling switch of this master selector circuit is driven if necessary (as the result of the energisation of its latch electromagnet) to couple the master selector circuit to the individual circuit of the primary selector to which the pulse which has set the wiper-side storage circuit IWS pertains, and the coupling switch test relay is operated. Thereupon the primary selector is driven if necessary and its wiper-choosing relay WS operated if necessary to connect its wiper-side terminal trunk through to the bank-side terminal trunk to which the pulse which has set the bank-side storage circuit IBS pertains, the selector-setting test relay of the master selector circuit being operated when the primary selector wipers occupy the relevant position. As soon as the through private or "P" wire is extended to, and is earthed at, a register taken into use for the call, the resetting circuit of the master selector circuit brings about the restoration to normal of the master selector circuit. The arrangements concerned with such restoration and with the driving and stopping of the coupling switch of a master selector circuit and with the driving and stopping of a primary selector will be referred to somewhat more fully later when the operation of an outgoing master selector circuit is dealt with, the reason for adopting this course being that an outgoing master selector circuit is represented in full in the schematic circuit diagram constituted by Figs. 2A and 2B whereas an incoming master selector circuit is only partly represented.

When the line associated with a bank-side terminal trunk of the group of primary selectors is the called line of a call or is one of a called group of lines, and the marker applies the backward-marking condition (20 volts negative) to the backward-marking wire 10 of the trunk, the backward-marking multiplex MX4 of the common control circuit produces on its output pulse highway 11 the pulse train pertaining to the trunk. This train is extended, assuming that no condition exists to cause the pulse-controlled backward-marking gate I6 to block the extension of the train, to the main backward-marking pulse highway 12. If at this time the forward-marking condition (20 volts negative) is extended to the outgoing forward-marking wire 27 of the wiper-side terminal trunk of at least one free primary selector of the group, causing the outgoing forward-marking multiplex MX5 to produce at least one pulse train on its output pulse highway 7, the appearance of pulse trains on both this pulse highway 7 and the main backward-marking pulse highway 12 causes a "connection can be made" signal (i. e. a 20 volts negative condition) to be reverted to the marker over the signal wire 24 connected to the marker, provided that there is a free outgoing master selector circuit available. This reversion of a "connection can be made" signal results from the application of a signal condition (20 volts negative) to the input wire 43 of the controlling gate G7 by the pulse lengthener L3 associated with the pulse highway 12, and the concurrent application of the same signal condition to the input wire 23 of the controlling gate G7 by the pulse lengthener L1 associated with the pulse highway 7. The controlling gate I3 which couples the output wire 22 of the pulse lengthener L1 to the input wire 23 of the controlling gate G7 serves to block the extension of the signal condition during periods in which there is no free outgoing master selector circuit available. Assuming that the marker, in response to the reversion of the "connection can be made" signal, applies a setting-initiating condition (earth) to the "connect" wire 48 individual to the common control circuit of the particular group of primary selectors being considered, and that at the time no master selector circuit is producing the pulse train corresponding to the bank-side terminal trunk concerned, the outgoing bank-side pulse-selection gate G8 is opened to permit the extension of the pulse train corresponding to this trunk to the outgoing bank-side selection pulse highway 17. In the case where the marker is applying the backward-marking condition to the backward-marking wire of more than one bank-side terminal trunk of the group, a number of pulse trains may be extended to the pulse highway 17 at this time. The application of the setting-initiating condition to the "connect" wire 48 causes the outgoing allotter A2 to allot a free outgoing master selector circuit for use on the call. The bank-side storage circuit OBS of the master selector circuit thus allocated is set by the first effective pulse extended to the outgoing bank-side selection pulse highway 17 subsequent to such allocation. The consequent appearance of the steady setting condition (20 or more volts negative) on the setting output wire (37) of this storage circuit causes the wiper-side storage circuit OWS of the same master selector circuit to be set by the first pulse present on the outgoing wiper-side selection pulse highway 8 subsequent to this appearance of the steady setting condition, with the result that a marking condition (earth) is produced on the marking output wire 42 corresponding to the wiper-side terminal trunk to which this pulse pertains. As a consequence of this, the relevant differentiating circuit element BD produces a setting-initiating condition (earth) for a brief period on the setting wire 32 of the relevant wiper-side terminal trunk. The first pulse present (as just referred to) on the selection pulse highway 8 is present by reason of the fact that the bank-side storage circuit OBS of the outgoing master selector circuit concerned, when set, produces the steady storage-circuit-set condition on the storage-circuit-set output wire 16 of this storage circuit, with the result that the relevant differentiating circuit element BC connected to this wire applies a setting-initiating condition (earth) for a brief period to the setting wiper CW3 of the coupling switch of the master selector circuit and thereby brings about the opening of the outgoing wiper-side pulse-selection gate G1. The opening of the pulse-selection gate G1 results from the fact that the setting-initiating condition, extended to an input wire 21 of the setting multiplex MX2 over the setting wiper CW3 of the coupling switch, causes this multiplex to produce on its output pulse highway 20 the pulse train pertaining to the primary selector to which this input wire belongs. This pulse train causes, through the medium of the setting pulse lengthener L2, the gate G1 to be opened on the occurrence of the first effective pulse of the train. Thus the pulse train which causes the outgoing wiper-side pulse-selection gate G1 to be opened pertains to the primary selector associated with the position in which the wipers of the relevant coupling switch happen to be standing when the setting-initiating condition appears on the setting wiper CW3 of this switch. It follows, by reason of the method of allocation of the channels of the wiper-side time-division-multiplex system, that the first pulse present on the outgoing wiper-side selection pulse highway 8 subsequent to the appearance of the steady setting condition on the setting output wire 37 of the bank-side storage circuit OBS of the master selector circuit concerned is a pulse, if two or more pulse trains exist on the output pulse highway 7 of the outgoing forward-marking multiplex MX5 at the time, of that one of these two or more trains which pertains to that one of the two or more corresponding primary selectors which is associated with that one of the two or more corresponding wiper positions which is reached first by the coupling switch wipers when these are driven from the position in which they happen to be standing. As a consequence of the setting of the bank-side storage circuit OBS and the wiper-side storage circuit OWS of the outgoing master selector circuit concerned, the coupling switch of this master selector circuit is driven if necessary, as the result of the energisation of its latch electromagnet LMA in a circuit over the relevant output wire 41 of the wiper-side storage circuit and a back contact ta1 of the coupling switch test relay, to couple the master selector circuit to the individual circuit of the primary selector to which the pulse which has set the wiper-side storage circuit pertains, and the coupling switch test relay TA is operated in a circuit over the relevant wiper CW1 of the coupling switch and the relevant marking output wire 42 of the wiper-side storage circuit. Upon the operation of the coupling switch test relay the associated auxiliary relay HA is operated. Thereupon the primary selector is driven if necessary and its wiper-choosing relay WS operated if necessary to connect its wiper-side terminal trunk through to the bank-side terminal trunk to which the pulse which has set the bank-side storage circuit OBS pertains, the selector-setting test relay TB of the master selector circuit being operated, in response to the potential marking condition applied to the marking output wire 56 concerned, when the primary selector wipers occupy the relevant position. The driving of the primary selector if necessary (as just referred to) results from the energisation of its latch electromagnet LMB in a circuit over a back contact tb1 of the selector-setting test relay of the master selector circuit, a front contact ha1 of the auxiliary relay of the master selector circuit, and the relevant coupling switch wiper CW4. The operation of relay WS if necessary (as just referred to) results from the energisation of its winding I in a circuit over the wiper-choosing output wire 40 of the bank-side storage circuit OBS concerned and a make contact ha2 of the auxiliary relay and the relevant coupling switch wiper CW5. As soon as the through private or "P" wire is extended to, and is earthed at, a supervisory link circuit (SLC, Fig. 1) taken into use for the call, relay WS if operated is locked up on its holding winding II in a circuit over contact ws1, and the resetting circuit of the master selector circuit brings about the restoration to normal of the bank-side storage circuit OBS and the consequent restoration to normal of the remainder of the master selector circuit. In the resetting circuit referred to, the presence of earth on the two input wires 45, 46 of the resetting circuit gate GR at the same time causes this gate to apply a resetting condition (earth) to the resetting wire 44 of the bank-side storage circuit.

Referring now to Fig. 3, this shows the form which the electronic incoming allotter A1 in Fig. 2A may take. In this form of allotter, for each incoming master selector circuit included in the common control circuit there is an allocation circuit comprising a control circuit terminal 133, an allocation circuit terminal 134, and a cold cathode gas-filled triode V1 which has a trigger resistor R10 and a cathode resistor R9. All the cold cathode gas-filled triodes V1 have a common anode load resistor R11. The control circuit terminals 133 of these allocation circuits are connected to the respective setting output wires 36 of the bank-side storage circuits concerned, and the allocation circuit terminals 134 are connected to the respective allocation wires 38 of these storage circuits. The control circuit terminals 133 are connected in the allotter, through coupling capacitors C1 individual to the terminals, to the grid of a first section (hereinafter termed the right-hand section) of a double-triode valve V2. The junction between the anodes of the triodes V1 and the common load resistor R11 is connected to the anode of the second section (hereinafter called the left-hand section) of the double-triode valve V2. The two sections of the valve V2 have a common cathode load resistor R8. The anode of the left-hand section of the valve V2 is coupled to the grid of the right-hand section by a capacitor C2, and this grid is connected to 150 volts positive over a resistor R6. The right-hand section of the valve V2 has an anode load resistor R7. The normal condition of the allotter is one in which a discharge is taking place between the anode and cathode of one, and only one, of the triodes V1, in which anode current is flowing in the right-hand section of the valve V2, and in which no anode current is flowing in the left-hand section of this valve. At the time when such a normal condition comes into being, the firing of the particular valve V1 concerned brings about a rise of potential of the allocation circuit terminal 134 associated with this valve, and thereby, by reason of the effect of such rise in the particular bank-side storage circuit connected to the relevant allocation wire 38, predetermines which free incoming master selector circuit is to be used next. When the bank-side storage circuit of an incoming master selector circuit thus preselected for use in set, and applies a steady setting condition (20 or more volts negative) to its setting output wire 36, the resulting fall of potential of the relevant control circuit terminal 133 is transmitted by the relevant capacitor C1 to the grid of the right-hand section of the valve V2, and causes a temporary cessation of the flow of anode current in this section. This temporary cessation of the flow of anode current in the right-hand section of the valve V2 causes current to flow in the left-hand section of this valve with a consequent lowering of the potential of the anodes of all the triodes V1, the discharge between the anode and cathode of the particular triode V1 associated with the set bank-side storage circuit being thereby extinguished. The capacitor C2 serves to cause the change of condition of the valve V2 to occur rapidly when initiated. After a brief delay, the valve V2 reverts to its normal condition in which anode current flows in the right-hand section and no anode curent flows in the left-hand section. Whilst an incoming master selector circuit is free, the corresponding setting output wire 36 and therefore the corresponding control circuit terminal 133 has a potential of 50 volts positive, with the result that a discharge takes place between the trigger electrode and the cathode of the corresponding triode V1. Whilst a master selector circuit is busy, the corresponding setting output wire 36 has a potential of 20 or more volts negative, with the result that no discharge takes place between the trigger electrode and the cathode of the corresponding triode V1. When the valve V2 reverts to its normal condition as previously mentioned, the potential of the anodes of the triodes V1 rises until the main gap (between anode and cathode) of one of these triodes associated with a free incoming master selector circuit (i. e. one of these triodes in which there is a discharge between the trigger electrode and the cathode) fires and brings about a rise of potential of the allocation circuit terminal 134 associated with this valve, and thereby preselects this master selector circuit as the one to be used next. Upon such firing, the resulting voltage drop across the common anode load resistor R11 ensures that no further triode V1 is fired (as regards its main gap) for the time being.

Referring now to Fig. 4, this shows the form which the electronic outgoing allotter A2 in Fig. 2A may take. In this form of allotter, there is an input terminal 169 which is connected to the "connect" wire 48 of the common control circuit, and which in the allotter itself is connected over a resistor R39 to the grid of a first section (hereinafter called the right-hand section) of a double-triode valve V13. For each outgoing master selector circuit included in the common control circuit, there is an allocation circuit comprising a control circuit terminal 170, an allocation circuit terminal 171, and a cold cathode gas-filled triode V14 which has a trigger resistor R42 and a cathode resistor R41. All the cold cathode gas-filled triodes V14 have a common anode load resistor R43. The control circuit terminals 170 of these allocation circuits are connected to the respective setting output wires 37 of the bank-side storage circuits concerned, and the allocation circuit terminals 171 are connected to the respective allocation wires 39 of these storage circuits. The junction between the anodes of the triodes V14 and the common load resistor R43 is connected to the anode of the second section (hereinafter called the left-hand section) of the double-triode valve V13. The two sections of the valve V13 have a common cathode load resistor R40. In the absence of a setting-initiating condition, the "connect" wire 48 and the input terminal 169 have a potential of 50 volts negative, with the result that (since the grid of the left-hand section of the valve V13 has a potential of 25 volts negative) anode current flows in the left-hand section of the valve V13 but not in the right-hand section. So long as anode current flows in the left-hand section of the valve V13, the discharge between the trigger electrode and cathode of a triode V14 (which takes place as described with reference to the corresponding triodes V1 in Fig. 3) does not cause this triode to fire so far as the main gap between the anode and cathode is concerned. This is because the flow of anode current in the left-hand section of the valve V13 produces a substantial voltage drop across the resistor R43 and thereby lowers the potential of the anodes of the triodes V14. When the setting-initiating condition (earth) appears on the "connect" wire 48 and the input terminal 169, the resulting change of potential of the grid of the right-hand section of the valve V13 causes anode current to flow in this section and to cease to flow in the left-hand section. Consequently, the potential of the anodes of the triodes V14 rises until the main gap of one of these triodes associated with a free outgoing master selector circuit (i. e. one of these triodes in which there is a discharge between the trigger electrode and the cathode) fires and brings about a substantial voltage drop across the resistor R43. Upon such firing, the resulting voltage drop across the relevant cathode resistor R41 brings about a rise of potential of the allocation circuit terminal 171 associated with the particular triode V14 concerned, thereby allocating for use the master selector circuit to which this terminal is connected. Upon the termination of the setting-initiating condition, the double-triode valve V13 reverts to its normal condition and the particular triode V14 referred to is extinguished. The allotter is then ready to allocate another outgoing master selector circuit in response to the appearance of the setting-initiating condition on the input terminal 169.

Referring now to Fig. 5, this shows the form which each of the bank-side storage circuits IBS, OBS of Fig. 2A may take, and the form which each of the two differentiating circuit elements BC, BE connected to the storage-circuit-set output wire 16 of such a storage circuit may take. The form which each of the two differentiating circuit elements referred to may take is shown in the chain-line rectangle DCE. Referring firstly to the form of bank-side storage circuit illustrated, in this form there is an electromagnetic relay W which serves for closing an operating circuit for the wiper-choosing relay WS of a primary selector when necessary. The recording by the storage circuit of the identity of a bank-side terminal trunk is effected by electronic storage equipment, and is in no way affected by the operating lag of the relay W. For each bank-side terminal trunk of the group of primary selectors, there is a storgae unit including an input gate, an input pulse lengthener, a cold cathode gas-filled valve V25, a marking output circuit, a controlling output circuit, and a pulse output gate. Each input gate comprises gating rectifiers MR38, MR39, and MR41, resistors R12, R70, and R71, capacitors C3 and C23, and a pulse supply terminal 186. The pulse supply terminal 186 is connected to a source of positive pulses which occupy the time positions pertaining to the relevant channel of the 200-channel bank-side time-division-multiplex system. All the input gates are associated with a common pulse input terminal 181 by means of a common pulse input system which includes three triodes V3, V4, and V5. The pulse input terminal 181 is connected to the relevant bank-side selection pulse highway 6, 17. Each input pulse lengthener comprises a capacitor C24 and a rectifier MR40. Each valve V25 has its trigger electrode connected to the associated pulse lengthener over a resistor R72, and is of a kind having an auxiliary gap, a circuit being provided over two resistors R74 and R75 for maintaining a continuous discharge between the electrodes of the auxiliary gap whereby the valve is enabled to operate from the charge available from the pulse lengthener capacitor C24. Each valve V25 has a resistor R81 in its cathode circuit. Each marking output circuit comprises a resistor R82, a rectifier MR43, a marking output terminal 184, and a marking potential supply terminal 189. The marking potential supply terminal 189 is connected to a source of negative potential, the potential concerned being different for each master selector circuit of the common control circuit and having a magnitude less than 100 volts. Normally, the potential of the marking output terminal 184 of a marking output circuit is 100 volts negative by reason of the connection to 100 volts negative over the resistors R81 and R82. The marking output terminal 184 is connected to the relevant marking output wire 55, 56. Each controlling output circuit comprises a rectifier MR37 which is connected to the grid resistor R76 of a triode V26 either through a rectifier MR45 or through a rectifier MR46, the last-mentioned method of connection, which involves the connection of the controlling output gate rectifier MR37 to the grid resistor R88 of a triode V27, being employed when the bank-side terminal trunk concerned is one in respect of which the wiper-choosing relay WS of a primary selector has to be operated. Each pulse output gate comprises a gating rectifier MR44, a resistor R80, a capacitor C27, and a pulse supply terminal 188. The pulse supply terminal 188 is connected to a source of positive pulses which occupy the time positions pertaining to the relevant channel of the 200-channel bank-side time-division-multiplex system. All the pulse output gates are associated with a common pulse output terminal 182 by way of a triode V28 which has an input resistor R83 in its grid circuit and a load resistor R84 in its cathode circuit and is connected to serve as an amplifier of the cathode-follower type. The pulse output terminal 182 is connected externally to the pulse highway 14 in the case of an incoming bank-side storage circuit and to the pulse highway 15 in the case of an outgoing bank-side storage circuit. The common pulse input system which includes the three triodes V3, V4, and V5 comprises an input amplifier, a controlling gate, a second amplifier, and a single-valve trigger circuit arranged as a so-called blocking oscillator circuit. The input amplifier comprises the triode V3, an input capacitor C21, a grid resistor R51, an anode resistor R52, and an output transformer TRP. The controlling gate comprises gating rectifiers MR33, MR34, MR35, and MR36, resistors R53 and R54, and a capacitor C22. The second amplifier comprises the triode V4. The single-valve trigger circuit comprises the triode V5, a transformer TRS, a capacitor C16, and two resistors R55 and R56. In addition to the elements already referred to, the form of bank-side storage circuit now being described includes two cold cathode gas-filled valves V22 and V23, a triode V24, various resistors and capacitors, an allocation circuit terminal 172, a setting output terminal 180, a wiper-choosing control circuit terminal 185, a resetting circuit terminal 177, and a storage-circuit-set output terminal 187. The allocation circuit terminal 172 is connected to the allocation wire 38, 39 associated with the master selector circuit concerned, the setting output terminal 180 is connected to the setting output wire 36, 37 of the storage circuit, the wiper-choosing control circuit terminal 185 is connected to the wiper-choosing output wire 40, the resetting circuit terminal 177 is connected to the resetting wire 44, and the storage-circuit-set output terminal 187 is connected to the storage-circuit-set output wire 16. The cold cathode gas-filled valves V22 and V23 have a common anode circuit load resistor R46, and each has an individual cathode circuit resistor R49, R50 shunted by a capacitor C18, C19. The arrangement is such that anode current flows in one or the other of thees two valves, the firing of the one in which anode current is not flowing serving to extinguish the flow of anode current in the other. Normally, anode current is flowing in the valve V23 and not in the valve V22. When the master selector circuit concerned is allocated for use by the relevant allotter, the potential of the allocation circuit terminal 172 rises suddenly and causes the coupling circuit constituted by the capacitor C17 and the resistors R44 and R45 to produce a positive pulse on the trigger electrode of the valve V22 so that this valve is fired and the valve V23 is extinguished. The consequential change of potential of the cathode of the valve V22, applied to the grid of the triode V24, produces a considerable increase in the anode current of the triode V24. The triode V24 has a resistor R57 connected in its cathode circuit, and when the anode current is increased as just mentioned the potential of the cathode of V24 becomes sufficiently positive to enable an effective high tension supply for the valves V25 to be derived from between the cathode of V24 and 100 volts negative. The rise of potential of the cathode of the triode V24 serves also to render the junction between the resistors R58 and R59 sufficiently positive to bias the normally-conducting rectifier MR35 to the non-conducting condition, with the result that the controlling gate of the common pulse input system is opened. Negative pulses received at the common pulse input terminal 181 are amplified by the input amplifier which applies corresponding positive pulses to the capacitor C22 of the controlling gate. Such pulses bias the gating rectifier MR33 to the non-conducting condition, but until the gate is opened as just mentioned flow of current through rectifiers MR34 and MR35 maintains the potential of the control grid of triode V4 at about 20 volts negative. The first effective pulse received at the common pulse input terminal 181 subsequent to the opening of the controlling gate causes the potential of the control grid of triode V4 to rise for the duration of the pulse (by reason of the connection over resistor R54 to 50 volts positive), with the result that a negative-going pulse is produced at the anode of this valve causing the single-valve trigger circuit to be triggered to an unstable condition. Normally, this trigger circuit is in a stable condition in which the valve V5 is biased to the anode current cut-off condition. The unstable condition is one which is terminated after a delay, and is one in which a substantial current flows through the cathode resistor R56 and in which grid current flows through the resistor R55. The flow of current through the cathode resistor R56 results in the appearance, at the junction between the capacitor C3 and the resistor R12 of each input gate, of a positive-going pulse which occurs in the same time period of the cycle of the bank-side time-division-multiplex system as the relevant pulse received at the common pulse input terminal 181. The flow of grid current through the resistor R55 causes the capacitor C16 to become charged to an extent which inhibits further triggering of the single-valve trigger circuit for a delay period longer than the periodic time of the bank-side time-division-multiplex cycle. The appearance, at the junction between the capacitor C3 and the resistor R12 of each input gate, of a positive-going pulse as just mentioned causes the gating rectifier MR39 in the relevant storage unit to be biased to the non-conducting condition and the charge on the capacitor C24 to be increased by current flow through the resistor R71 and the rectifier MR40. The storage unit concerned is of course the one in which a positive pulse is applied to the terminal 186 coincidentally with the said positive-going pulse. The potential of the junction between the capacitor C24 and the rectifier MR40 in this storage unit is thus raised sufficiently to fire the valve V25 of the unit. This firing of one of the valves V25 renders it impossible for a further valve V25 of the bank-side storage circuit to strike for the time being, this result being due to the fact that such firing affects the triode V26 and causes the anode of this triode and the terminal 180 to assume a potential of 20 or more volts negative so that the gating rectifier MR36 conducts and closes the controlling gate of which it forms part. A potential of 20 or more volts negative on the terminal 180 constitutes the steady setting condition. Upon the firing of the valve V25 of the storage unit concerned, its cathode potential rises (to earth, or a value near earth potential) by reason of the voltage drop across the cathode resistor R81, the rise being sufficient to cause the rectifier MR43 of the marking output circuit of the unit to conduct and bring the relevant marking output terminal 184 to the marking potential peculiar to the bank-side storage circuit. The rise also affects the triode V26 to cause the anode of this valve to assume a potential of 20 or more volts negative as already mentioned. As previously explained, the rectifier MR37 constituting the controlling output circuit of a storage unit, and forming the coupling between the valve V25 of the unit and the triode V26, is connected to the grid resistor R76 of V26 either through the rectifier MR45 or the rectifier MR46. If the storage unit concerned corresponds to a bank-side terminal trunk in respect of which the wiper-choosing relay WS of a primary selector has to be operated (in which case the coupling between V25 and V26 is through the rectifier MR46), the rise of potential of the cathode of the fired valve V25 causes sufficient anode current to flow through the triode V27 to bring about the operation of the relay W. Upon operation, relay W at its contact w1 connects earth to the wiper-choosing control circuit terminal 185. In any case, the rise of potential of the cathode of the fired valve V25 raises the potential of the storage-circuit-set output terminal 187 to the value constituting the storage-circuit-set condition. Further, the rise of potential of the cathode of the fired valve V25 opens the pulse output gate of the storage unit concerned, the gating rectifier MR44 of which is normally biased to the non-conducting condition. Thus positive pulses which occupy the time positions pertaining to the relevant channel of the 200-channel bank-side time-division-multiplex system are applied to the pulse output terminal 182, the pulse output from the pulse output gate being amplified by the triode V28. When the master selector circuit concerned has performed its functions in respect of the call for which it has been taken into use, the potential of the resetting circuit terminal 177 is changed (as the result of the earthing of the private wire of the primary selector wiper-side terminal trunk concerned) from 50 volts negative to earth. The coupling circuit constituted by the capacitor C20 and the resistors R47 and R48 thereupon produces a positive pulse on the trigger electrode of the valve V23 so that this valve is fired and the valve V22 is extinguished. The potential of the cathode of the triode V24 again becomes negative, causing the whole bank-side storage circuit to revert to its normal condition. As has already been stated, the form which each of the two differentiating circuit elements BC, BE connected to the storage-circuit-set output wire 16 of such a storage circuit may take is shown in the chain-line rectangle DCE. This form of differentiating circuit element comprises an input terminal 173, an output terminal 174, a cold cathode gas-filled valve V15, a rectifier MR42, resistors R85, R86, R87, and R90, and capacitors C25 and C26. The output terminal 174 is connected to the wire 58 of the master selector circuit in the case of the circuit element BC, and to the primary selector master-selector-set wire 18 in the case of the element BE. When the potential of the input terminal 173 is raised to the value constituting the storage-circuit-set condition, the resulting positive-going pulse applied to the trigger electrode of the valve V15 fires this valve which then remains conducting for a period determined by the capacitor C26. Whilst the valve V15 is conducting, the rectifier MR42 is conducting and the potential of the output terminal 174 is held at about earth potential. Thus upon the firing of the valve V15 the setting-initiating or master-selector-set condition as the case may be (earth in each case) is applied for a brief period to the output terminal 174.

Figure 6:
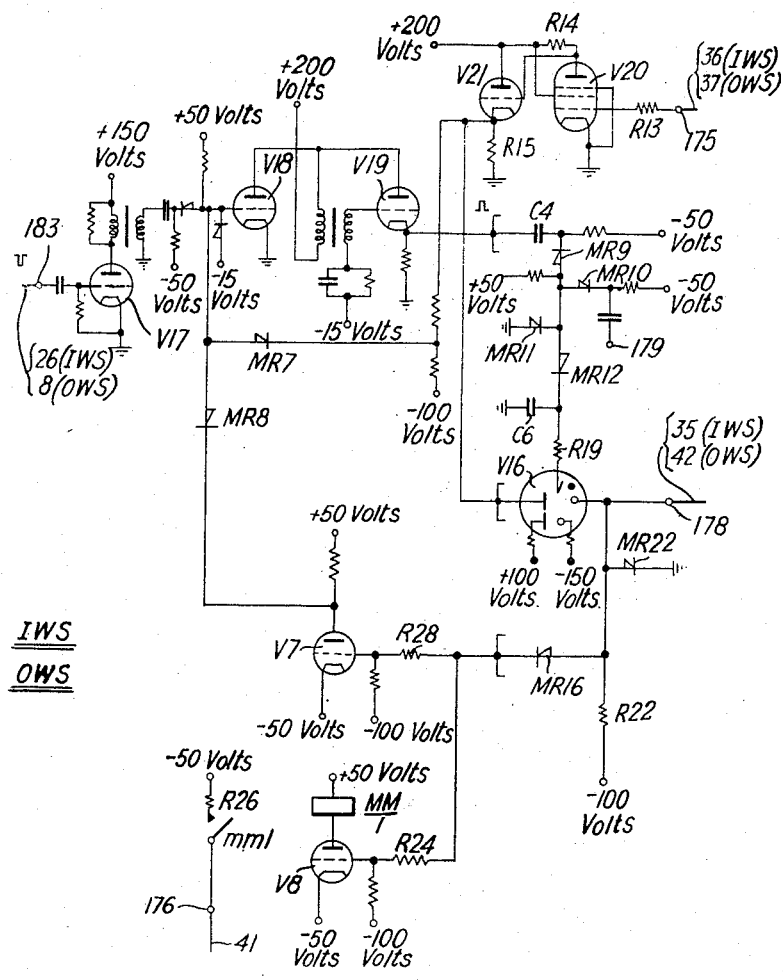

Referring now to Fig. 6, this shows the form which each of the wiper-side storage circuits IWS, OWS of Fig. 2A may take. A number of the elements of this form of wiper-side storage circuit correspond to elements of the form of storage circuit which has just been described with reference to Fig. 5, and such elements and their operation will not be described in detail. In this form of wiper-side storage circuit, there is an electromagnetic relay MM which serves for closing a point in the circuit of the latch electromagnet LMA of the coupling switch of the master selector circuit concerned. The recording by the storage circuit of the identity of a wiper-side terminal trunk is effected by electronic storage equipment, and is in no way affected by the operating lag of the relay MM or dependent upon the coupling of the master selector circuit to a primary selector. For each primary selector of the group (i. e. for each wiper-side terminal trunk concerned), there is a storage unit comprising an input gate, an input pulse lengthener, a cold cathode gas-filled valve V16, a marking output circuit, and a controlling output circuit. Each input gate includes gating rectifiers MR9, MR10, and MR11, a capacitor C4, and a pulse supply terminal 179. The pulse supply terminal 179 is connected to a source of positive pulses which occupy the time positions pertaining to the relevant channel of the wiper-side time-division-multiplex system. All the input gates are associated with a common pulse input terminal 183 by means of a common pulse input system which includes three triodes V17, V18, and V19. The pulse input terminal 183 is connected to the relevant wiper-side selection pulse highway 26, 8. Each input pulse lengthener comprises a capacitor C6 and a rectifier MR12. Each valve V16 has its trigger electrode connected to the associated pulse lengthener over a resistor R19. Each marking output circuit comprises a resistor R22, a rectifier MR22, and a marking output terminal 178 which is connected to the relevant marking output wire 35, 42. Each controlling output circuit comprises a rectifier MR16 which is connected to the respective grid resistors R28 and R24 of two triodes V7 and V8. In addition to the elements already referred to, the form of wiper-side storage circuit now being described includes a pentode V20, a triode V21, various resistors, capacitors, and rectifiers, a setting circuit terminal 175, and a latch electromagnet control circuit terminal 176. The terminal 175 is connected to the setting output wire 36, 37 of the associated bank-side storage circuit. The terminal 176 is connected to the wire 41 of the master selector circuit concerned. Inside the wiper-side storage circuit, the terminal 175 is connected to the control grid of the pentode V20 over a grid resistor R13. The pentode has an anode load resistor R14 by which it is coupled to the triode V21. Normally, the potential of the setting circuit terminal 175 is about 50 volts positive. When the associated bank-side storage circuit produces the steady setting condition (20 or more volts negative) on the terminal 175, the pentode V20 is brought to the anode current cut-off condition and a considerable increase occurs in the anode current of the triode V21. The triode V21 has a resistor R15 connected in its cathode circuit, and when the anode current is increased as just mentioned the potential of the cathode of V21 becomes sufficiently positive to enable an effective high tension supply for the valves V16 to be derived from between the cathode of V21 and 100 volts negative. The rise of potential of the cathode of the triode V21 serves also to bias the normally-conducting rectifier MR7 to the non-conducting condition, with the result that the controlling gate of the common pulse input system (i. e. the gate between the triodes V17 and V18) is opened. The first effective pulse received at the common pulse input terminal 183 subsequent to the opening of the controlling gate causes the gating rectifier MR11 in the relevant storage unit to be biased to the non-conducting condition and the charge on the capacitor C6 to be increased, as will be clear from the description given of the corresponding operation of the circuit arrangements of Fig. 5. The storage unit concerned is of course the one in which a positive pulse is applied to the terminal 179 coincidentally with the said first effective pulse. The potential of the junction between the capacitor C6 and the rectifier MR12 in this storage unit is thus raised sufficiently to fire the valve V16 of the unit. This firing of one of the valves V16 renders it impossible for a further valve V16 of the wiper-side storage circuit to strike for the time being, this result being due to the fact that it causes, through the medium of the triode V7, the gating rectifier MR8 to conduct and close the controlling gate of which it forms part. Upon the firing of the valve V16 of the storage unit concerned, its cathode potential rises to about earth by reason of the voltage drop across the resistor R22, the rise being limited by flow of current through the rectifier MR22, which is normally biased to the non-conducting condition. Thus the relevant marking output terminal 178 is brought to the marking condition (earth). The rise of potential of the cathode of the fired valve V16 causes sufficient anode current to flow through the triode V8 to bring about the operation of the relay MM. Upon operation, relay MM at its contact $mm1$ connects the latch electromagnet control circuit terminal 176 to 50 volts negative over a resistor R26. When the steady setting condition on the terminal 175 is removed in the associated bank-side storage circuit, the potential of the cathode of the triode V21 reverts to its normal value and an effective high tension supply no longer exists for the valves V16 and the wiper-side storage circuit is restored to its normal condition.

Referring now to Fig. 7, this shows the form which may be taken by the control circuit, represented by the potential detector PD in the functional schematic circuit diagram of Fig. 2B, of the high-speed electromagnetic test relay TB of a master selector circuit. This form of control circuit has an input terminal 190 which is connected to the wire 54 of the master selector circuit concerned, and a marking potential supply terminal 191 which is connected to the same source of negative potential as the marking potential supply terminal 189 of the bank-side storage circuit of the master selector circuit concerned. This form of control circuit also includes a triode V29, a grid resistor R73, and rectifiers MR47, MR48, MR49, and MR50. Normally, the potential applied to the input terminal 190, by way of the marking wiper M of a primary selector and the relevant wiper CW2 of the coupling switch of the master selector circuit, is 100 volts negative. In these normal circumstances, current flows from the terminal 191 to the terminal 190 through MR50, R73, and MR48, with the result that the grid of the triode V29 is biased sufficiently negatively with respect to the cathode to ensure that the relay TB is not operated. Current flows in the same way, with the same result, when the marking wiper M of a primary selector, connected through to terminal 190, encounters a marking potential more negative than the potential connected to the terminal 191. When the marking wiper M of a primary selector, connected through to terminal 190, encounters a marking potential less negative than the potential connected to the terminal 191, current flows from the terminal 190 to the terminal 191 through MR47, R73, and MR49, with the result that the grid of the triode V29 is biased sufficiently negatively with respect to the cathode to ensure that the relay TB is not operated. When the marking wiper M of a primary selector, connected through to terminal 190, encounters the same marking potential as is connected to the terminal 191, the grid and cathode of the triode V29 assume the same potential with the result that sufficient anode current flows to operate the relay TB.

Referring now to Fig. 8, this shows in detail the form taken by an incoming link circuit ILC (Fig. 1). Wires 28, 29, 30, and 57 are connected to the corresponding wires of the relevant primary selector wiper-side terminal trunk (Fig. 2B). Wires 74, 28A, 29A, 30A, 73, 75, 67, 68, and 69 are connected to corresponding wires of the relevant register secondary selector bank-side terminal trunk. Wires 70, 71, 72, and 60 are connected to corresponding wires of the relevant incoming secondary selector bank-side terminal trunk. Wire 57 is connected to wire 74 by way of an isolating resistor R91 and an isolating rectifier MR51. The switching relay H of the link circuit has four contacts h1, h2, h3, and h4. Wire 75 is connected to wire 57 over back contact h4 and a resistor R92, and is connected to wire 60 over front contact h4. The functions of the link circuit were broadly described with reference to Fig. 1.

Referring now to Figs. 9A and 9B, these when placed side by side with Fig. 9B to the right of Fig. 9A together constitute a schematic circuit diagram of a register secondary selector and the allotter common to the group of register secondary selectors to which this selector belongs, and of a register tertiary selector and the allotter common to the group of register tertiary selectors to which this selector belongs. In this schematic circuit diagram, the parts above the horizontal chain line belong to the register secondary selector and the associated allotter, and the parts below this line belong to the register tertiary selector and the associated allotter. The individual circuit of each register secondary selector is arranged so that the selector serves when set to provide through connections between on the one hand bank-side terminal trunk wires comprising an incoming set of line and private wires 28A, 29A, and 30A, an outgoing set of line and private wires 67, 68, and 69, a relay-control wire 73, and a forward-marking wire 75, and on the other hand the respective corresponding wires 28B, 29B, 30B, 67B, 68B, 69B, 73B, and 75B of a wiper-side terminal trunk. In addition to the wires just mentioned, each bank-side terminal trunk includes a start wire 74, and each wiper-side terminal trunk includes an incoming forward-marking wire 79. When a forward-marking condition (earth) is extended from a primary selector, through the resistor R92 in the incoming link circuit individual to that selector, to the forward-marking wire 75 of a bank-side terminal trunk of the group of register secondary selectors, the forward-marking condition is also extended, over the resistor R91 and rectifier MR51 in this link circuit and start wire 74, to a start wire 76 of the allotter. This start wire is connected to 100 volts negative battery through winding I of a centre-stable polarised relay PP, and normally the extension of the forward-marking condition as just mentioned causes this relay to close the lower one (as shown in the drawing) of the two make contacts constituted by its contact pp1 and thereby operate a high-speed start relay PB. On operation, relay PB at its contact pb1 completes a pulse input circuit associated with a closed counting chain D of cold cathode gas-filled valves, wire 77 being connected to a source of stepping pulses. This chain D serves as a distributor, and in response to pulses in the pulse input circuit produces a triggering potential on each of a plurality of output leads 78 in turn, there being a cold cathode gas-filled valve and an output lead 78 for each register secondary selector of the group. Each such selector has individual to it an electronic trigger circuit T having a setting input wire 80 which is linked to the relevant lead 78 by an inhibiting gate I7 individual to the selector. Each gate I7 serves to prevent the transmission of the triggering potential from the corresponding lead 78 to the corresponding setting input wire 80 at times when the earth busying condition exists on the corresponding private wire 30B. Each register secondary selector of the group also has individual to it a controlling relay RL, a high-speed test relay TC, a potential detector PDD, a resetting gate G9, a rectifier MR52, and resistors R93, R94, and R95. The potential detector PDD serves to operate the relay TC when, and only when, the forward-marking condition (earth) appears on the marking wiper MG of the selector. When the triggering potential appears on the output lead 78 associated with a free register secondary selector, the electronic trigger circuit T individual to the selector is set with the result that the corresponding controlling relay RL is operated. Thereupon the selector is driven if necessary until its wipers occupy a position in which they are connected to a bank-side terminal trunk marked by the application of the forward-marking condition (earth) to its forward-marking wire 75, the high-speed test relay TC individual to the selector being operated to open the driving circuit when the selector wipers occupy such a position. The driving of the selector if necessary (as just referred to) results from the energisation of its latch electromagnet LMC in a circuit over the back contact tc1 and front contact rl1 of its individual circuit. Upon the operation of the controlling relay RL individual to the selector, contact rl2 applies earth over the relevant resistor R94 and rectifier MR52 to a stop wire 81 connected to negative battery through winding II of the centre-stable polarised relay PP, and thereby causes this relay to restore to normal unless a condition demanding further allocation exists. Contact rl3 applies the forward-marking condition (earth) to the forward-marking wire 79 of the wiper-side terminal trunk of the selector. Upon restoration of the relay PP, the start relay PB is released. If the condition should arise that the number of register secondary selectors allocated exceeds the number required, the centre-stable polarised relay PP closes the upper one (as shown in the drawing) of the two make contacts constituted by its contact pp1, and thereby operates a high-speed stop relay PA. On operation, the stop relay at its contacts pa1 and pa2 applies earth to the contacts, corresponding to a special stopping position, in the banks of the marking and incoming private wipers MG and IC/P of the selectors of the group. The resistors R96 and R97 are common to all these selectors, and the operation of contacts pa1 and pa2 causes at least one allocated selector to be stopped at the special stopping position by the operation of its high-speed test relay TC and to have its trigger circuit T restored to normal by the appearance of the earth busying condition on its incoming private wiper IC/P. Normally, the incoming through private wire 30B is maintained at a potential of 50 volts negative by a connection over a resistor R33. As soon as the incoming through private wire 30B of an allocated register secondary selector is extended to, and is earthed at, a register taken into use for the call, the resetting circuit gate G9 individual to the selector receives a signal input condition (earth) on each of its input wires 30B and 82, and accordingly produces the resetting condition on the resetting input wire 83 of the trigger circuit T of the selector, bringing about the restoration to normal of this trigger circuit. Further allocation of the selector is prevented so long as the incoming through private wire 30B remains earthed, since the earth on this wire holds closed the gate I7 associated with the relevant output lead 78 of the distributor D. The constitution and organisation of the gate G9 shown schematically in Fig. 9A may be on known lines and do not form part of the present invention. The potential detector PDD may be on similar lines to the one shown in Fig. 7. A form which the elements pb1, D, I7, and T shown schematically in Fig. 9A may together take is shown in Fig. 10 and will be described later in this specification.

As will be clear from the schematic circuit diagram constituted by Figs. 9A and 9B, in which the parts below the chain line belong to a register tertiary selector and the associated allotter, in the case of a group of register tertiary selectors both the allotter common to the group and the individual circuits of the selectors are constituted on very similar lines to those which have just been described with reference to a group of register secondary selectors. Only the differences will be referred to in detail in this specification. The relays PPA, PAA, PBA, and RLA correspond to relays PP, PA, PB, and RL. The latch electromagnet LMD corresponds to the latch electromagnet LMC. The individual circuit of each register tertiary selector is arranged so that the selector serves when set to provide through connections between on the one hand bank-side terminal trunk wires comprising an incoming set of line and private wires 28B, 29B, and 30B, an outgoing set of line and private wires 67B, 68B, and 69B, and a relay-control wire 73B, and on the other hand the respective corresponding wires 28C, 29C, 30C, 67C, 68C, 69C, and 73C of a wiper-side terminal trunk. In addition to the wires just mentioned, each bank-side terminal trunk includes an incoming forward-marking wire 79 and a forward-marking wire 75B, and each wiper-side terminal trunk includes an incoming forward-marking wire 83 and an outgoing forward-marking wire 84. Each bank-side terminal trunk has individual to it a switching relay HH, a rectifier MR53, and resistors R98 and R99. When a forward-marking condition (earth) is extended from a register secondary selector to the incoming forward-marking wire 79 of a bank-side terminal trunk of the group of register tertiary selectors, the forward-marking condition is extended over the corresponding resistor R99 and back contact hh1 to the relevant contact in the bank of the marking wiper MGA of each register tertiary selector of the group. It is also extended, over the relevant resistor R98 and rectifier MR53, to the start wire 85 of the allotter. The setting of a free register tertiary selector then takes place in the same manner as in the case of a register secondary selector, and upon the operation of the relay RLA associated with this selector the contact rla3 of this relay applies the forward-marking condition (earth) to the incoming forward-marking wire 83 of the wiper-side terminal trunk concerned. The register connected to this wiper-side terminal trunk, in response to such application of the forward-marking condition and the extension of the calling loop, applies an engaging earth to the incoming private wire 30C of the trunk and applies earth to the relay-control wire 73C of the trunk, thereby operating both the switching relay HH individual to the register tertiary selector bank-side terminal trunk concerned and the switching relay H in the incoming link circuit concerned. The switching relay HH, upon operation, completes at its contact hh1 a through connection between the outgoing forward-marking wire 84 of the wiper-side terminal trunk and the forward-marking wire 75B of the bank-side terminal trunk.

Referring now to Fig. 10, this shows the form which the pulse source connected to the wire 77, the contact pb1, the distributor D, the gate I7, and the trigger circuit T in Fig. 9A may together take. The form of circuit shown constitutes a practical realisation of the arrangements shown schematically in Fig. 9A and just enumerated, but the translation from the functional schematic to the practical circuit is rather free in character, so that for example the make contact pb1 of Fig. 9A becomes a break contact pb1 in Fig. 10, and the gate I7 of Fig. 9A becomes embodied in the direct current energising circuit for relay RL. When relay PB operates, a capacitor C7 charges over two resistors R16 and R17 until a cold cathode gas-filled diode V30 fires. The resistance of the resistors R16 and R17 is too high for the discharge through the diode to be maintained, and after a brief interval the diode is extinguished. The capacitor C7 again charges until the diode again fires, and so on. The diode V30 thus generates a relaxation oscillation. The frequency of this oscillation may conveniently be arranged to be about 10 cycles per second. The successive positive-going pulses produced at the cathode of the diode V30, by reason of the presence of a cathode resistor R18, are applied over input capacitors C8 and grid resistors R21 to the trigger electrodes of the closed counting chain D of cold cathode gas-filled valves. This counting chain is of the well-known type in which the valves are fired in turn in response to the applied pulses, the firing of one valve serving to extinguish the preceding valve in the chain and serving also to bias the succeeding valve so that this succeeding valve fires in response to the next applied pulse. The action of this well-known type of chain results from the presence of a common resistor R25 in the anode circuits of all the valves of the chain, and of a cathode resistor R23 shunted by a capacitor C9 individual to each valve of the chain. As each valve in the chain fires, it applies the triggering potential to the corresponding output lead 78. Each trigger circuit T includes two cold cathode gas-filled valves V32 and V33, five resistors R27, R29, R30, R31, and R32, two capacitors C10 and C11, a setting input terminal 88, an inhibiting input terminal 86, and a resetting input terminal 87. Normally, the valve V33 is in the fired condition and the valve V32 is extinguished. The terminal 88 is connected to the corresponding ouput lead 78 of the distributor D, the terminal 86 is connected to the incoming private wire 30B of the relevant register secondary selector wiper-side terminal trunk, and the terminal 87 is connected to the output wire 83 of the relevant gate G9 (Fig. 9A). Whilst an earth busying condition exists on the private wire 30B connected to terminal 86, the appearance of the positive triggering potential on the lead 78 connected to terminal 88 does not bring about the firing of the valve V32 of the trigger circuit (assuming that the valve is not already in the fired condition). Whilst the relevant register secondary selector wiper-side terminal trunk is free, the potential of the private wire 30B connected to terminal 86 is 50 volts negative, and the appearance of the positive triggering potential on terminal 88 serves to bring about the firing of the valve V32, the necessary coupling between terminal 88 and the trigger electrode of V32 being constituted by the capacitor C10 and resistors R27 and R29. Upon the firing of the valve V32, the valve V33 of the trigger circuit is extinguished by reason of the presence of the common resistor R30 in the anode circuits of the two valves, and relay RL is operated. The valve V32, when it has thus been fired, remains in the fired condition, and holds relay RL operated, until the relevant gate G9 (Fig. 9A) applies earth to the wire 83 connected to the terminal 87. When earth is thus applied to the trigger electrode of the valve V33 over the resistor R31, the valve V33 fires, bringing about the extinguishing of the valve V32 and the release of relay RL. The charge on the capacitor C11 ensures that the valve V33 is extinguished when the valve V32 is again fired.

Referring now to Fig. 11, this shows the individual circuit of an incoming secondary selector ISS (Fig. 1) and the common control circuit of the group of incoming secondary selectors to which this selector belongs, and is a schematic circuit diagram of the so-called functional type. To avoid unnecessary detailed description, each element of Fig. 11 which corresponds to an element of Figs. 2A and 2B is given the same designation as the corresponding element of Figs. 2A and 2B with the addition of the suffix Y. Each incoming secondary selector has two sets of positive and negative line wipers and private wipers, and has one marking wiper MY, and its individual circuit includes a wiper-choosing relay WSY. The wiper-side terminal trunk of an incoming secondary selector, in addition to the positive and negative line wires 28Y and 29Y and the private wire 30Y, comprises an outgoing forward-marking wire 89 and a setting wire 90. The outgoing forward-marking wire 89 is linked by a forward-marking gate IAY with a group outgoing forward-marking wire 97 in the common control circuit. The forward-marking gate IAY is individual to the incoming secondary selector and is arranged to block the extension of the forward-marking condition (20 volts negative) from the group outgoing forward-marking wire 97 during periods in which the private wire 30Y of the wiper-side terminal trunk of the selector is earthed, and during periods in which any one of a number of master selector circuits included in the common control circuit is in process of setting up a call over the incoming secondary selector. For simplicity, only one of these master selector circuits is included in the circuit diagram. A bank-side terminal trunk of the group of incoming secondary selectors, as well as including the positive and negative line wires 70 and 71 and the private wire 72, also includes an outgoing forward-marking wire 60. It is arranged that a forward-marking condition (20 volts negative) on the outgoing forward-marking wire 60 of a bank-side terminal trunk of the group produces the forward-marking condition on the group outgoing forward-marking wire 97, the wire 60 of each bank-side terminal trunk being for this purpose linked to the wire 97 by an individual isolating gate G11. Each master selector circuit includes two electronic storage circuits, a wiper-side storage circuit YWS and a bank-side storage circuit YBS. The bank-side storage circuit YBS serves to record, in respect of a call for which the master selector circuit is taken into use, over which particular bank-side terminal trunk a forward-marking condition has been received in respect of the call. The wiper-side storage circuit YWS serves to record, in respect of a call for which the master selector circuit is taken into use, which particular incoming secondary selector of the group is to be set to connect its wiper-side terminal trunk to the bank-side terminal trunk concerned. The bank-side storage circuit YBS of each master selector circuit has an input wire 92 individual to, and linked by a polarity reverser PR to the outgoing forward-marking wire 60 of, each bank-side terminal trunk of the group, and has a marking output wire 91 corresponding to each input wire. Each polarity reverser PR serves to produce a setting-initiating condition (earth) on the associated wire 92 in response to a forward-marking condition on the associated wire 60. Each bank-side storage circuit YBS serves to produce, in response to the application of a setting-initiating condition (earth) to an input wire 92, a marking condition, peculiar to the master selector circuit concerned, on the corresponding marking output wire 91. The last-mentioned marking condition is a negative potential condition, the magnitude of the negative potential being less than 100 volts and being peculiar to, and indicative of, the particular master selector circuit. Each marking output wire 91 is connected to the respective wire 98, corresponding to the relevant bank-side terminal trunk, of the 100 wires of the group bank multiple which are connected to the bank contacts associated with the marking wipers MY of the incoming secondary selectors of the group. The bank-side storage circuit YBS of each master selector circuit also serves to produce, in response to the application of a setting-initiating condition (earth) to an input wire 92, a steady setting condition (50 volts negative) on a setting output wire 37Y and a relay-operating condition (earth) if necessary on a wiper-choosing output wire 40Y. The setting output wire 37Y of a bank-side storage circuit YBS is connected so that the existence of the steady setting condition on it serves to intimate to an electronic allotter A2Y included in the common control circuit that the particular master selector circuit concerned has been taken into use for a call, and serves to prepare the wiper-side storage circuit YWS of this master selector circuit for performing its functions in respect of the call. Each input wire 92 of a bank-side storage circuit YBS is linked to the input wire 93 of the allotter A2Y by an isolating gate G10 individual to the relevant bank-side terminal trunk. The wiper-side storage circuit YWS of each master selector circuit has an input wire individual to, and connected to the setting wire 90 of, the wiper-side terminal trunk of each incoming secondary selector of the group, and has a marking output wire 95 corresponding to each input wire. It serves to produce, in response to the application of a setting-initiating condition (earth) to an input wire 90 for a brief period, a steady marking condition (earth) on the corresponding marking output wire 95. Each marking output wire 95 is connected to the particular bank contact which pertains to the individual circuit of the relevant incoming secondary selector in the bank of a marking wiper CWY1 of a coupling switch of the master selector circuit, and is also connected so that the existence of the marking condition on it serves to bring the forward-marking gate IAY of this individual circuit to the blocking condition, being for this purpose linked to the inhibiting input wire 96 of this gate IAY by an individual isolating gate GOY. The wiper-side storage circuit YWS also serves to produce, in response to the application of a setting-initiating condition (earth) to an input wire 90 for a brief period, the closing, dependent upon the coupling switch test relay TAY, of an energising circuit for the latch electromagnet LMAY of the coupling switch, and the application of a master-selector-set condition (a positive-going pulse) to a single storage-circuit-set output wire 212. Apart from the differences already mentioned, the connections to the coupling switch wipers and banks correspond to those which have been described with reference to the common control circuit of a group of primary selectors. The constitution and organisation of the elements G10 and G11 shown schematically in Fig. 11 may be on known lines and do not form part of the present invention. Forms which the elements YBS, YWS, and PR may conveniently take are shown in Figs. 12, 13, and 14, and will be described later in this specification.

When a forward-marking condition (20 volts negative) appears on the outgoing forward-marking wire 60 of a bank-side terminal trunk of the group of incoming secondary selectors, the condition is extended, over the relevant gate G11 and over those gates IAY to which no inhibiting condition is applied, to the outgoing forward-marking wire 89 of each free incoming secondary selector of the group. In response to the appearance of the forward-marking condition on the wire 60 concerned, a master selector circuit is allocated by the allotter A2Y for use on the call, and the bank-side storage circuit YBS of this master selector circuit is set to record the identity of the bank-side terminal trunk concerned. Upon the subsequent appearance of a setting-initiating condition (earth) on the setting wire 90 of a free wiper-side terminal trunk, the wiper-side storage circuit YWS of the allocated master selector circuit is set to record the identity of this particular wiper-side terminal trunk. When this occurs, the consequent application of the master-selector-set condition to the output wire 212 of the wiper-side storage circuit brings about the release of the marker and the removal of the forward-marking condition from the wire 60 concerned. As a consequence of the setting of the bank-side storage circuit YBS and the wiper-side storage circuit YWS of the master selector circuit concerned, the coupling switch of this master selector circuit is driven if necessary (as the result of the energisation of its latch electromagnet LMAY) to couple the master selector circuit to the individual circuit of the relevant incoming secondary selector, and the coupling switch test relay TAY is operated. Thereupon the incoming secondary selector is driven if necessary (as the result of the energisation of its latch electromagnet LMBY) and its wiper-choosing relay WSY operated if necessary to connect its wiper-side terminal trunk through to the relevant bank-side terminal trunk, the selector-setting test relay TBY of the master selector circuit being operated when the incoming secondary selector wipers occupy the relevant position. As soon as the condition arises that the last-mentioned test relay is operated and the private wire 30Y of the wiper-side terminal trunk concerned is extended to, and is earthed at, a supervisory link circuit (SLC, Fig. 1) taken into use for the call, the resetting circuit of the master selector circuit brings about the restoration to normal of the bank-side storage circuit YBS and the consequent restoration to normal of the remainder of the master selector circuit.

Referring next to Fig. 12, this shows the form which the bank-side storage circuit YBS in Fig. 11 may take. In this form of storage circuit, there is an electromagnetic relay WY which serves for closing an operating circuit for the wiper-choosing relay (WSY) of an incoming secondary selector when necessary. The recording by the storage circuit of the identity of a bank-side terminal trunk is effected by electronic storage equipment, and is in no way affected by the operating lag of the relay WY. For each bank-side terminal trunk of the group of incoming secondary selectors, there is a storage unit comprising an input terminal 205, an input resistor R131, an input rectifier MR60, a cold cathode gas-filled valve V40, a resistor R123, a cathode circuit rectifier MR61, a cathode circuit resistor R124, an inhibiting output terminal 206, and a marking output circuit. The inhibiting output terminal 206 is not used in the case of the storage units of the bank-side storage circuit YBS in Fig. 11, but is included in order to render the form of storage circuit shown in Fig. 12 suitable for use also as a bank-side storage circuit pertaining to a group of intermediate selectors. The input terminals 205 of the storage units are connected to the respective input wires 92. Each marking output circuit comprises a resistor R132, a rectifier MR62, a marking output terminal 209, and a marking potential supply terminal 211. The marking potential supply terminal 211 is connected to a source of negative potential, the potential concerned being different for each master selector circuit of the common control circuit and having a magnitude less than 100 volts. Normally, the potential of the marking output terminal 209 of a marking output circuit is 100 volts negative by reason of a connection to 100 volts negative over the relevant resistor R124. The marking output terminal 209 is connected to the relevant marking output wire 91. In addition to the elements already referred to, the storage circuit includes four cold cathode gas-filled valves V37, V38, V41, and V44, two triodes V39 and V42, various resistors and capacitors, two impulse-producing transformers TRD and TRE, an allocation circuit terminal 203, a setting output terminal 204, a wiper-choosing control circuit terminal 207, a resetting circuit terminal 208, and a storage-circuit-set output terminal 210. The terminals 203, 204, 207, and 208 are connected to the relevant wires 39Y, 37Y, 40Y, and 44Y respectively. The storage-circuit-set output terminal 210 is not used in the case of the bank-side storage circuit YBS in Fig. 11, but is included in order to render the form of storage circuit shown in Fig. 12 suitable for use also as a bank-side storage circuit pertaining to a group of intermediate selectors. The cold cathode gas-filled valves V37 and V38 have a common anode circuit load resistor R117, and each has an individual cathode circuit resistor (R120, R121) shunted by a capacitor (C42, C43). Normally, anode current is flowing in the valve V38 and not in the valve V37. When the master selector circuit concerned is allocated for use by the allotter (A2Y, Fig. 11), the potential of the allocation circuit terminal 203 rises suddenly, with the result that the coupling circuit constituted by the capacitor C41 and the resistors R115 and R116 produces a positive pulse on the trigger electrode of the valve V37, so that this valve is fired and the valve V38 is extinguished. The potential of the setting output terminal 204 consequently changes from about 50 volts positive to about 50 volts negative. The corresponding consequential change of the cathode of the valve V37 is from 50 volts negative to about 50 volts positive, and produces a considerable increase in the anode current of the triode V39. The triode V39 has a resistor R127 connected in its cathode circuit, and when the anode current is increased as just mentioned the potential of the cathode of V39 becomes sufficiently positive to enable an effective high tension supply for the valves V40, V41, and V44 to be derived from between the cathode of V39 and 100 volts negative. The capacitor C45 is a decoupling capacitor. The cathode of the triode V39 is coupled to the grid of the triode V42 by the resistors R125, R128, and R129, and the appearance of the positive potential at the cathode of the triode V39 causes the potential of the cathode of the triode V42 to rise, by reason of an increased flow of current through the cathode circuit resistor R130, to at least earth. As soon as all the changes just outlined have taken place, the cold cathode gas-filled valve V40 of the storage unit associated with the particular bank-side terminal trunk concerned is fired, owing to the potential of its trigger electrode rising to at least earth by reason of the existence of the setting-initiating condition (earth) on the relevant input terminal 205 in conjunction with the rise of potential of the cathode of the triode V42. All the triodes V40 of the bank-side storage circuit have a common anode circuit resistor R122, and have their cathode circuit resistors R124 connected to 100 volts negative, either through the primary winding I of the impulse-producing transformer TRE or through the primary winding I of the impulse-producing transformer TRD, the last-mentioned method of connection being employed when the bank-side terminal trunk concerned is one in respect of which the wiper-choosing relay WSY in an incoming secondary selector has to be operated. Upon the firing of the valve V40 of the storage unit concerned, the potential of its cathode rises to earth by reason of the voltage drop across the cathode resistor R124 and the relevant transformer primary winding, the rise being limited by the presence of the rectifier MR61 and being sufficient to cause the rectifier MR62 of the marking output circuit of the unit to conduct and bring the relevant marking output terminal 209 to the marking potential peculiar to the bank-side storage circuit. The earth condition on the terminal 206 concerned constitutes an inhibiting condition. If the valve V40 concerned is one which has its cathode circuit completed through the primary winding I of the transformer TRD, then the voltage impulse produced in the secondary winding II of the transformer when this valve fires serves to fire the valve V41, being applied in the requisite sense to the trigger electrode of the valve V41 through a resistor R126. The firing of the valve V41 brings about the operation of the relay WY, with the result that the wiper-choosing control circuit terminal 207 is connected to earth. If the valve V40 concerned is one which has its cathode circuit completed through the primary winding I of the transformer TRE, then the valve V44 is fired instead of the valve V41. In either case the firing brings about, as the result of the connection over the resistors R128 and R129, a lowering of the potential of the control grid of the triode V42. The resulting fall in the anode current of the triode V42 causes the potential of the cathode of this valve to become about 50 volts negative. As long as the potential of the cathode of the triode V42 remains at this value, the striking of a further valve V40 in response to an applied setting-initiating condition is prevented, since the input rectifiers MR60 of the storage units prevent the potentials of the trigger electrodes of the respective valves V40 from becoming more positive than the cathode of the triode V42. Upon the firing of the valve V41 or V44, the rise of potential of the terminal 210 due to the presence of the cathode resistor R142 constitutes a storage-circuit-set condition. When the master selector circuit concerned has performed its functions in respect of the call for which it has been taken into use, the potential of the resetting circuit terminal 208 is changed from 50 volts negative to earth. The coupling circuit constituted by the capacitor C44 and the resistors R118 and R119 thereupon produces a positive pulse on the trigger electrode of the valve V38 so that this valve is fired and the valve V37 is extinguished. The potential of the cathode of the valve V39 again becomes negative, causing the whole bank-side storage circuit to revert to its normal condition.

Referring next to Fig. 13, this shows the form which the wiper-side storage circuit YWS in Fig. 11 may take. In this form of storage circuit, there is an electromagnetic relay MMY which serves for closing a point in the circuit of the latch electromagnet LMAY of the coupling switch of the master selector circuit concerned. The recording by the storage circuit of the identity of a wiper-side terminal trunk is effected by electronic storage equipment, and is in no way affected by the operating lag of the relay MMY or dependent upon the coupling of the master selector circuit to an incoming secondary selector. For each incoming secondary selector of the group (i. e. for each wiper-side terminal trunk concerned), there is a storage unit comprising an input terminal 136, an input resistor R148, an input rectifier MR63, a cold cathode gas-filled valve V47, a trigger electrode circuit resistor R149, a cathode circuit rectifier MR64, a cathode circuit resistor R150, and a marking output terminal 137. The input terminals 136 of these storage units are connected to the respective setting wires 90, and the marking output terminals 137 are connected to the respective marking output wires 95. In addition to the storage units and the relay MMY already referred to, the storage circuit includes a cold cathode gas-filled valve V48, two triodes V46 and V49, a pentode V45, various resistors and capacitors, an impulse-producing transformer TRF, a setting circuit terminal 135, a latch electromagnet control circuit terminal 138, and a storage-circuit-set output terminal 213. The terminal 135 is connected to the setting output wire 37Y of the associated bank-side storage circuit, and the terminal 138 is connected to the wire 94 of the master selector circuit concerned. The terminal 213 is connected to the storage-circuit-set output wire 212. Inside the wiper-side storage circuit, the terminal 135 is coupled to the control grid of the pentode V45 by an input circuit comprising resistors R143 and R144. The pentode has an anode load resistor R145 by which it is coupled to the triode V46. Normally, the potential of the setting circuit terminal 135 is about 50 volts positive. When the associated bank-side storage circuit produces the steady setting condition (about 50 volts negative) on the terminal 135, the pentode V45 is brought to the anode current cut-off condition and a considerable increase occurs in the anode current of the triode V46. The triode V46 has a resistor R146 connected in its cathode circuit, and when the anode current is increased as just mentioned the potential of the cathode of V46 becomes sufficiently positive to enable an effective high tension supply for the valves V47 and V48 to be derived from between the cathode of V46 and 100 volts negative. Decoupling capacitors C46 and C47 are associated with this high tension supply circuit. The cathode of the triode V46 is coupled to the grid of the triode V49 by the resistor R152, the winding of relay MMY, and the resistors R153 and R154, and the appearance of the positive potential at the cathode of the triode V46 causes the potential of the cathode of the triode V49 to rise, by reason of an increased flow of current through the cathode circuit resistor R155, to at least earth. As soon as all the changes just outlined have taken place, the storage circuit is fully prepared for setting in response to the receipt of the setting-initiating condition on an input terminal 136. Upon such receipt of a setting-initiating condition over the setting wire 90 of a wiper-side terminal trunk of an incoming secondary selector of the group, the valve V47 of the storage unit associated with this trunk is fired, owing to the potential of its trigger electrode rising to at least earth by reason of the existence of the setting-initiating condition on the relevant input terminal 136 in conjunction with the rise of potential of the cathode of the triode V49. All the triodes V47 of the wiper-side storage circuit have a common anode circuit resistor R147, and have their cathode circuit resistors R150 connected to 100 volts negative through the primary winding I of the impulse-producing transformer TRF. When a valve V47 fires as just mentioned, the potential of its cathode rises to earth but is prevented from becoming positive by the effect of the rectifier MR64. The marking output terminal 137 is thus in effect earthed to provide the requisite marking condition on the marking output wire 95 concerned. Upon the commencement of the flow of anode current through the valve V47, a voltage impulse is produced in the secondary winding II of the impulse-producing transformer TRF and serves to fire the valve V48, being applied in the requisite sense to the trigger electrode of the valve V48 through a resistor R151. The voltage impulse just mentioned is also applied as a positive-going pulse to the storage-circuit-set output terminal 213, and constitutes the master-selector-set condition on the wire 212 connected to this terminal. As a consequence of the firing of the valve V48, the potential of its anode falls, and this causes the grid potential, and therefore the anode current, of the triode V49 to fall. This fall in the anode current of the triode V49 causes the potential of the cathode of this valve to become about 50 volts negative. As long as the potential of the cathode of the triode V49 remains at this value, the striking of a further valve V47 in response to an applied setting-initiating condition is prevented, since the input rectifiers MR63 of the storage units prevent the potentials of the trigger electrodes of the respective valves V47 from becoming more positive than the cathode of the triode V49. The firing of the valve V48 brings about the operation of the relay MMY, with the result that the latch electromagnet control circuit terminal 138, connected to wire 94, is connected by contact mmy1 to 50 volts negative battery over a resistor R156. When the steady setting condition on the terminal 135 is removed in the associated bank-side storage circuit, the potential of the cathode of the triode V46 reverts to its normal value and an effective high tension supply no longer exists for the valves V47 and V48 and the wiper-side storage circuit is restored to its normal condition.

Referring next to Fig. 14, this shows the form which the polarity reverser PR in Fig. 11 may conveniently take. This form of reverser comprises a triode V50, four resistors R157, R158, R159, and R160, an input terminal 214, and an output terminal 215. The input terminal 214 is connected to the outgoing forward-marking wire 60 of the incoming secondary selector group bank-side terminal trunk concerned, and the output terminal 215 is connected to the wire 92 corresponding to this terminal trunk. Normally, the input terminal 214 is at earth potential, and the constants of the circuit are made such that the corresponding potential of the output terminal 215 is 50 volts negative. When the forward-marking condition (20 volts negative) appears at the input terminal 214, the resulting rise of potential of the anode of the triode V50 causes the potential of the output terminal 215 to rise to about earth, thereby producing the setting-initiating condition (earth) on the wire 92 connected to this terminal.

Referring now to Figs. 15A and 15B, these when placed side by side with Fig. 15B to the right of Fig. 15A together constitute a schematic circuit diagram of an intermediate selector IS (Fig. 1) and the common control circuit of the group of intermediate selectors to which this selector belongs, this schematic circuit diagram being of the so-called functional type. To avoid unnecessary detailed description, each element of Figs. 15A and 15B which corresponds to an element of Figs. 2A and 2B is given the same designation as the corresponding element of Figs. 2A and 2B with the addition of the suffix X. Each intermediate selector has two sets of positive and negative line wipers and private wipers, and has one marking wiper MX, and its individual circuit includes a wiper-choosing relay WSX. The wiper-side terminal trunk of an intermediate selector, in addition to the positive and negative line wires 28X and 29X and the private wire 30X, comprises an outgoing forward-marking wire 27X and a setting wire 32X. The outgoing forward-marking wire 27X is connected to an input wire, individual to the trunk, of a forward-marking multiplex MX5X forming part of a time-division-multiplex system local to the common control circuit. Each intermediate selector of the group has allocated to it, for selection controlling purposes, an individual channel of this system. In response to the presence of the forward-marking condition (20 volts negative) on an input wire, the forward-marking multiplex MX5X produces the pulse train pertaining to the trunk concerned on a forward-marking pulse highway 7X. A bank-side terminal trunk of the group of intermediate selectors, as well as including the positive and negative line wires 51X and 52X and the private wire 53X, also includes an outgoing forward-marking wire 216 and a setting wire 217. The outgoing forward-marking wire 216 is linked by a forward-marking gate I8 with a group outgoing forward-marking wire 23X in the common control circuit. The forward-marking gate I8 is individual to the bank-side terminal trunk and is arranged to block the extension of the forward-marking condition from the group outgoing forward-marking wire 23X during periods in which the private wire 53X of the bank-side terminal trunk is earthed and during periods in which any one of a number of master selector circuits included in the common control circuit is in process of setting up a call over this trunk. For simplicity, only one of the master selector circuits, and parts of another, are represented in the schematic circuit diagram. A pulse lengthener L1X associated with the forward-marking pulse highway 7X has an output circuit 22X linked to the group outgoing forward-marking wire 23X over a group forward-marking gate I3X which is open except when no master selector circuit is free and available. In addition to the forward-marking multiplex, the time-division-multiplex system includes a setting multiplex MX2X. Each master selector circuit includes two electronic storage circuits, a wiper-side storage circuit OWSX and a bank-side storage circuit XBS. The bank-side storage circuit XBS serves to record, in respect of a call for which the master selector circuit is taken into use, over which particular bank-side terminal trunk a setting-initiating condition (earth) has been received in respect of the call. The wiper-side storage circuit OWSX serves to record, in respect of a call for which the master selector circuit is taken into use, which particular intermediate selector of the group is to be set to connect its wiper-side terminal trunk to the bank-side terminal trunk concerned. Each master selector has individual to it a coupling switch having wipers CW1X to CW6X, and the allocation of the channels of the time-division-multiplex system to the intermediate selectors of the group is such that the channels, if taken in the cyclic order of occurrence of the respective time positions pertaining thereto in one complete cycle of such time positions, pertain respectively to the intermediate selectors arranged in the cyclic order in which the wipers of each master selector coupling switch when rotated make contact with the respective sets of bank contacts associated with these selectors, corresponding contacts in the banks of the different coupling switches being associated with the same intermediate selector. The bank-side storage circuit XBS of each master selector circuit has an input wire individual to, and connected to the setting wire 217 of, each bank-side terminal trunk of the group, and has a marking output wire 219 corresponding to each input wire. It serves to produce, in response to the application of a setting-initiating condition (earth) to an input wire for a brief period, a marking condition, peculiar to the master selector circuit, on the corresponding marking output wire 219. This marking condition is a negative potential condition, the magnitude of the negative potential being less than 100 volts and being peculiar to, and indicative of, the particular master selector circuit. Each marking output wire 219 is connected to the respective wire 49X, corresponding to the relevant bank-side terminal trunk, of the 100 wires of the group bank multiple which are connected to the bank contacts associated with the marking wipers MX of the intermediate selectors of the group. The bank-side storage circuit XBS of each master selector circuit also serves to produce, in response to the application of a setting-initiating condition (earth) to an input wire for a brief period, a steady setting condition (50 volts negative) on a setting output wire 37X and a relay-operating condition (earth) if necessary on a wiper-choosing output wire 40X. The setting output wire 37X of a bank-side storage circuit XBS is connected so that the existence of the steady setting condition on it serves to intimate to an electronic allotter A2X included in the common control circuit that the particular master selector circuit concerned has been taken into use for a call, and serves to prepare the wiper-side storage circuit OWSX of this master selector circuit for performing its functions in respect of the call. The setting output wire 37X of each bank-side storage circuit XBS is connected to constitute an input wire of a controlling gate G2X. This controlling gate has an input wire for each master selector circuit, and is arranged to produce a gate-closing condition (to close the gate I3X) when the condition obtains that the steady setting condition exists on the setting output wires 37X of all the master selector circuits of the common control circuit. Each bank-side storage circuit XBS, when set, produces a steady storage-circuit-set condition (rise of potential) on a single storage-circuit-set output wire 16X, and thereby brings about the application of a setting-initiating condition for a brief period to a setting wiper CW3X of the coupling switch of the master selector circuit concerned. Further, each bank-side storage circuit XBS, when set, produces an inhibiting condition (earth) on an inhibiting output wire 218 individual to the relevant bank-side terminal trunk. A controlling gate G13 individual to a bank-side terminal trunk provides an inhibiting condition (earth) on its output wire 218 whenever an inhibiting condition exists in respect of the bank-side terminal trunk with which this gate is associated. As regards each intermediate selector of the group, the corresponding input wire 21X of the setting multiplex MX2X is connected to the contact corresponding to the selector in the banks of the setting wipers CW3X of the coupling switches of the master selector circuits. The output pulse highway 7X of the forward-marking multiplex MX5X is connected over a pulse-selection gate G1X to a selection pulse highway 8X. The pulse-selection gate G1X is closed except whilst the setting multiplex MX2X is producing pulses on its output pulse highway. The wiper-side storage circuit OWSX of each master selector circuit has an input circuit connected to the selection pulse highway 8X, and has a marking output wire 42X individual to each channel of the time-division-multiplex system. It serves to produce, in response to the first pulse present on the selection pulse highway 8X subsequent to the appearance of the setting condition (50 volts negative) on the setting output wire 37X of the associated bank-side storage circuit XBS, a steady marking condition (earth) on the corresponding marking output wire 42X. The first pulse present as just referred to is present by reason of the fact that the setting-initiating condition (earth), extended to an input wire 21X of the setting multiplex MX2X over the setting wiper CW3X of the coupling switch of the master selector circuit, causes this multiplex to produce on its output pulse highway 20X the pulse train pertaining to the intermediate selector to which this input wire belongs, and thereby causes the pulse-selection gate G1X to be opened on the occurrence of the first effective pulse of the train. Thus the pulse train which causes the pulse-selection gate G1X to be opened pertains to the intermediate selector associated with the position in which the wipers of the coupling switch happen to be standing when the setting-initiating condition appears on the setting wiper CW3X of this switch. It follows by reason of the method of allocation of the channels of the time-division-multiplex system that the first pulse present on the selection pulse highway 8X as referred to is a pulse, if two or more pulse trains exist on the output pulse highway 7X of the forward-marking multiplex MX5X at the time, of that one of these two or more trains which pertains to that one of the two or more corresponding intermediate selectors which is associated with that one of the two or more corresponding wiper positions which is reached first by the coupling switch wipers when these are driven from the position in which they happen to be standing. Each marking output wire 42X of the wiper-side storage circuit OWSX of a master selector circuit is connected to the particular bank contact which pertains to the individual circuit of the relevant intermediate selector in the bank of a marking wiper CW1X of the coupling switch of the master selector circuit, and is also connected, by way of a controlling gate G12 and a differentiating circuit element BDX, so that the existence of the marking condition (earth) on it serves to produce a setting-initiating condition (earth) for a brief period on the setting wire 32X of the relevant wiper-side terminal trunk. The gate G12 and differentiating circuit element BDX are both individual to the wiper-side terminal trunk. The gate G12 has an input wire for each master selector circuit and serves to produce an earth condition on its output wire 59X whilst an earth condition exists on any input wire. The wiper-side storage circuit when set also serves to produce the closing, depending upon the coupling switch test relay TAX, of an energising circuit for the latch electromagnet LMAX of the coupling switch. Apart from the differences already mentioned, the connections to the coupling switch wipers and banks correspond to those which have been described with reference to the common control circuit of a group of primary selectors. The constitution and organisation of the elements G12, G13, and I8 shown schematically in Figs. 15A and 15B may be on known lines and do not form part of the present invention. The elements XBS may conveniently take the form shown in Fig. 12.

When a forward-marking condition (20 volts negative) appears on the outgoing forward-marking wire 27X of the wiper-side terminal trunk of at least one free intermediate selector of the group, the outgoing forward-marking multiplex MX5X produces the corresponding pulse train or trains on its output pulse highway 7X. As a consequence of this, the forward-marking pulse lengthener L1X produces the forward-marking condition on its output circuit 22X and, assuming that there is a free master selector circuit available, the forward-marking condition is extended over the gate I3X, and over those gates I8 to which no inhibiting condition is applied, to the outgoing forward-marking wire 216 of each free bank-side terminal trunk. Upon the subsequent appearance of a setting-initiating condition (earth) for a brief period on the setting wire 217 of a forward-marked bank-side terminal trunk, a master selector circuit is allocated by the allotter A2X for use on the call, and the bank-side storage circuit XBS of this master selector circuit is set to record the identity of the bank-side terminal trunk concerned. The consequent appearance of the steady seting condition (50 volts negative) on the setting output wire 37X of this storage circuit causes the wiper-side storage circuit OWSX of the same master selector circuit to be set by the first pulse present on the selection pulse highway 8X subsequent to this appearance of the steady setting condition, with the result that a marking condition (earth) is produced on the marking output wire 42X corresponding to the wiper-side terminal trunk to which this pulse pertains. As a consequence of this, the relevant differentiating circuit element BDX produces a setting-initiating condition (earth) for a brief period on the setting wire 32X of the relevant wiper-side terminal trunk. As has already been explained, the first pulse present on the selection pulse highway 8X as just referred to is a pulse, if two or more pulse trains exist on the output pulse highway 7X of the multiplex MX5X at the time, of that one of these two or more trains which pertains to that one of the two or more corresponding intermediate selectors which is associated with that one of the two or more corresponding wiper positions which is reached first by the coupling switch wipers when these are driven from the position in which they happen to be standing. As a consequence of the setting of the bank-side storage circuit XBS and the wiper-side storage circuit OWSX of the master selector circuit concerned, the coupling switch of this master selector circuit is driven if necessary (as the result of the energisation of its latch electromagnet LMAX) to couple the master selector circuit to the individual circuit of the relevant intermediate selector, and the coupling switch test relay TAX is operated. Thereupon the intermediate selector is driven if necessary (as the result of the energisation of its latch electromagnet LMAX) and its wiper-choosing relay WSX operated if necessary to connect its wiper-side terminal trunk through to the relevant bank-side terminal trunk, the selector-setting test relay TBX of the master selector circuit being operated when the incoming secondary selector wipers occupy the relevant position. As soon as the condition arises that the last-mentioned test relay is operated and the private wire 30X of the wiper-side terminal trunk concerned is extended to, and is earthed at, a supervisory link circuit (SLC, Fig. 1) taken into use for the call, the resetting circuit of the master selector circuit brings about the restoration to normal of the bank-side storage circuit XBS and the consequent restoration to normal of the remainder of the master selector circuit.

In the case of a group of outgoing secondary selectors, both the common control circuit and the individual circuits of the selectors are constituted on, and operate on, similar lines to those which have just been described with reference to a group of intermediate selectors.

What is claimed is:

1. In an automatic exchange system, a plurality of ranks of selectors including a rank of primary selectors, at least one group of selectors in each of said ranks, terminal trunks pertaining to each side of each such group of selectors, a common control circuit for each such group of selectors, a calling terminal trunk pertaining to one such group of selectors, said one such group being in a rank other than said rank of primary selectors and said calling terminal trunk being marked as calling by a forward marking applied to it by a register associated with a marker, means for extending the forward marking forwards from said calling terminal trunk, by way of the common control circuits pertaining to the groups of selectors involved, over every available path between this terminal trunk and free selectors in said rank of primary selectors, a free called circuit to which said calling terminal trunk is to be connected, said free called circuit being marked as called by a backward marking applied to it by the marker and being directly accessible to the selectors of a further such group of selectors, said further such group being in said rank of primary selectors and containing at least one free selector to which the forward marking is extended from said calling terminal trunk, means for extending a setting-initiating signal backwards from said further such group of selectors towards said calling terminal trunk for bringing about the appropriation of a particular available path over which the forward marking is extended from this terminal trunk, said setting-initiating signal being applied to the common control circuit of said further such group by the marker, electronic means for each such group of selectors involved for recording the identity of the two terminal trunks, one pertaining to one side and one pertaining to the other side of the group, included in said particular available path, said electronic means being set in response to the setting-initiating signal, means for giving a signal to the marker as soon as each said electronic means has been set, means for rendering the terminal trunks concerned unavailable for use on other calls during the period in which their identities are recorded by a said electronic means, means for and controlled by each said electronic means for controlling the setting of the relevant selector to effect a through connection between the particular terminal trunks the identities of which are recorded by the electronic means, and means for terminating the forward marking in respect of said calling terminal trunk as soon as each said electronic means has been set.

2. In an automatic exchange system as claimed in claim 1, a time-division-multiplex system pertaining to a said group of selectors and having a channel individual to each terminal trunk pertaining to one side of the group, a multichannel pulse transmission circuit of said time-division-multiplex system, means responsive to the appearance of a forward marking on a free terminal trunk pertaining to said one side for producing a pulse train corresponding to this marked terminal trunk in said multichannel pulse transmission circuit, a master selector circuit, an electro-mechanical uniselector having no home position for coupling said master selector circuit to any selector of the group, an electronic storage circuit in said master selector circuit, a pulse-selection gate for controlling the connection of said multichannel pulse transmission circuit to said electronic storage circuit, means for opening said pulse-selection gate at a time in the cycle of said time-division-multiplex system determined by the existing position of the wipers of said uniselector, means in said master selector circuit for rendering said electronic storage circuit responsive to a pulse received by the storage circuit by way of said pulse-selection gate, and means in said electronic storage circuit for applying a further marking to the terminal trunk corresponding to a pulse in said multichannel pulse transmission circuit to which the storage circuit has responded.

3. In an automatic exchange system, a group of primary selectors, a common control circuit for said group of primary selectors, a plurality of incoming master selector circuits, a plurality of outgoing master selector circuits, line-side terminal trunks pertaining to the line circuit side of said group of primary selectors, selector-side terminal trunks pertaining to the other side of said group of primary selectors, a forward-marking wire in each said line-side terminal trunk marked in response to the assumption of the calling condition by the line to which the terminal trunk is connected, a backward-marking wire in each said line-side terminal trunk marked by a marker when the line to which the terminal trunk is connected is called, an incoming forward-marking wire in each said selector-side terminal trunk, an outgoing forward-marking wire in each said selector-side terminal trunk, means in said common control circuit for preselecting a free one of said incoming master selector circuits for use on a call, means in said common control circuit, responsive to the appearance of the marking condition on the forward-marking wire of a said line-side terminal trunk, for appropriating the preselected one of said incoming master selector circuits for use on a call, electronic storage equipment in each of said incoming master selector circuits for recording, in respect of a call for which the incoming master selector circuit has been taken into use, the identities of the particular free selector-side terminal trunk and particular line-side terminal trunk, having the marking condition on its forward-marking wire, which are to be interconnected for the setting up of the call, said electronic storage equipment including means for extending the marking condition to the incoming forward-marking wire of a selector-side terminal trunk the identity of which it is recording, means in said common control circuit, responsive to the receipt of a setting-initiating condition over a wire incoming from the marker, for allotting a free one of said outgoing master selector circuits for use on a call, and electronic storage equipment in each of said outgoing master selector circuits for recording, in respect of a call for which the outgoing master selector circuit has been taken into use, the identities of the particular free selector-side terminal trunk, having the marking condition on its outgoing forward-marking wire, and particular line-side terminal trunk, having the marking condition on its backward-marking wire, which are to be interconnected for the setting up of the call.

4. An automatic exchange system as claimed in claim 1 wherein each said common control circuit includes a plurality of master selector circuits and at least one electronic allotter for allotting a free one of said master selector circuits for use on a call, each said master selector circuit including an electronic storage circuit for recording the identity of a terminal trunk pertaining to one side of the group of selectors to which the common control circuit pertains and an electronic storage circuit for recording the identity of a terminal trunk pertaining to the other side of this group.

5. An automatic exchange system as claimed in claim 4 including means in each said master selector circuit, responsive to the appearance of a normal busying and holding condition on a terminal trunk the identity of which is recorded in the master selector circuit, for freeing the master selector circuit for further use.

No references cited.